(12) United States Patent
Yamada et al.

(10) Patent No.: US 10,942,585 B2
(45) Date of Patent: Mar. 9, 2021

(54) TRACKABILITY ENHANCEMENT OF A PASSIVE STYLUS

(71) Applicant: ZSpace, Inc., Sunnyvale, CA (US)

(72) Inventors: Kevin S. Yamada, Sunnyvale, CA (US); Jonathan J. Hosenpud, San Francisco, CA (US); Christian R. Larsen, Sunnyvale, CA (US); David A. Chavez, San Jose, CA (US); Arthur L. Berman, San Jose, CA (US); Clifford S. Champion, San Jose, CA (US)

(73) Assignee: ZSPACE, INC., Sunnyvale, CA (US)

( * ) Notice: Subject to any disclaimer, the term of this patent is extended or adjusted under 35 U.S.C. 154(b) by 0 days.

(21) Appl. No.: 16/683,717

(22) Filed: Nov. 14, 2019

(65) Prior Publication Data

US 2021/0026464 A1    Jan. 28, 2021

Related U.S. Application Data

(60) Provisional application No. 62/877,133, filed on Jul. 22, 2019.

(51) Int. Cl.
*G06F 3/0346* (2013.01)
*G06F 3/0488* (2013.01)
*G06F 3/0354* (2013.01)

(52) U.S. Cl.
CPC ........ *G06F 3/0346* (2013.01); *G06F 3/03545* (2013.01); *G06F 3/04883* (2013.01)

(58) Field of Classification Search
CPC .................................................... G06F 3/0346
See application file for complete search history.

(56) References Cited

U.S. PATENT DOCUMENTS

| | | | |
|---|---|---|---|
| 6,262,719 B1 | 7/2001 | Bi et al. | |
| 7,348,969 B2 | 3/2008 | Robrecht et al. | |
| 8,125,469 B2 | 2/2012 | Badaye et al. | |
| 8,686,371 B1 | 4/2014 | Bernath et al. | |
| 8,760,398 B2 | 6/2014 | Pryor et al. | |
| 10,241,622 B1 | 3/2019 | Usey | |
| 2002/0008781 A1 | 1/2002 | Cori et al. | |
| 2002/0134594 A1 | 9/2002 | Taylor et al. | |

(Continued)

OTHER PUBLICATIONS

International Search Report and Written Opinion for PCT/US2020/043038, dated Oct. 13, 2020, 7 pgs.

*Primary Examiner* — Chun-Nan Lin
(74) *Attorney, Agent, or Firm* — Kowert, Hood, Munyon, Rankin & Goetzel, P.C.

(57) ABSTRACT

Systems and methods for enhancing trackability of a passive stylus. A six degree of freedom (6DoF) location and orientation of a passive stylus may be tracked by a tracking system via a retroreflector system disposed on the passive stylus. Additionally, characteristic movements of one of a user's finger, hand, and/or wrist may be recognized by the tracking system. The passive stylus may useable to interact with a virtual 3D scene being displayed via a 3D display. A user input via the passive stylus may be determined based on the tracked 6DoF location and orientation of the passive stylus and/or the recognized characteristic movements. The retroreflector system may include multiple patterns of retroreflectors and one of the patterns may be a spiral pattern of retroreflectors disposed along a longitudinal axis of the passive stylus.

30 Claims, 13 Drawing Sheets

(56) References Cited

U.S. PATENT DOCUMENTS

| | | | |
|---|---|---|---|
| 2008/0040692 A1* | 2/2008 | Sunday | G06F 3/04883 |
| | | | 715/863 |
| 2008/0122786 A1 | 5/2008 | Pryor et al. | |
| 2013/0229389 A1* | 9/2013 | DiVerdi | G06F 3/0488 |
| | | | 345/179 |
| 2013/0234934 A1* | 9/2013 | Champion | G06F 3/012 |
| | | | 345/156 |
| 2014/0081610 A1* | 3/2014 | DiVerdi | G06F 3/03545 |
| | | | 703/6 |
| 2015/0248189 A1* | 9/2015 | Routley | G06F 1/1673 |
| | | | 345/175 |
| 2017/0102791 A1 | 4/2017 | Hosenpud et al. | |
| 2017/0168652 A1* | 6/2017 | Lipman | G06F 3/03545 |
| 2019/0146089 A1* | 5/2019 | Nagalla | G01C 15/00 |
| | | | 356/620 |

* cited by examiner

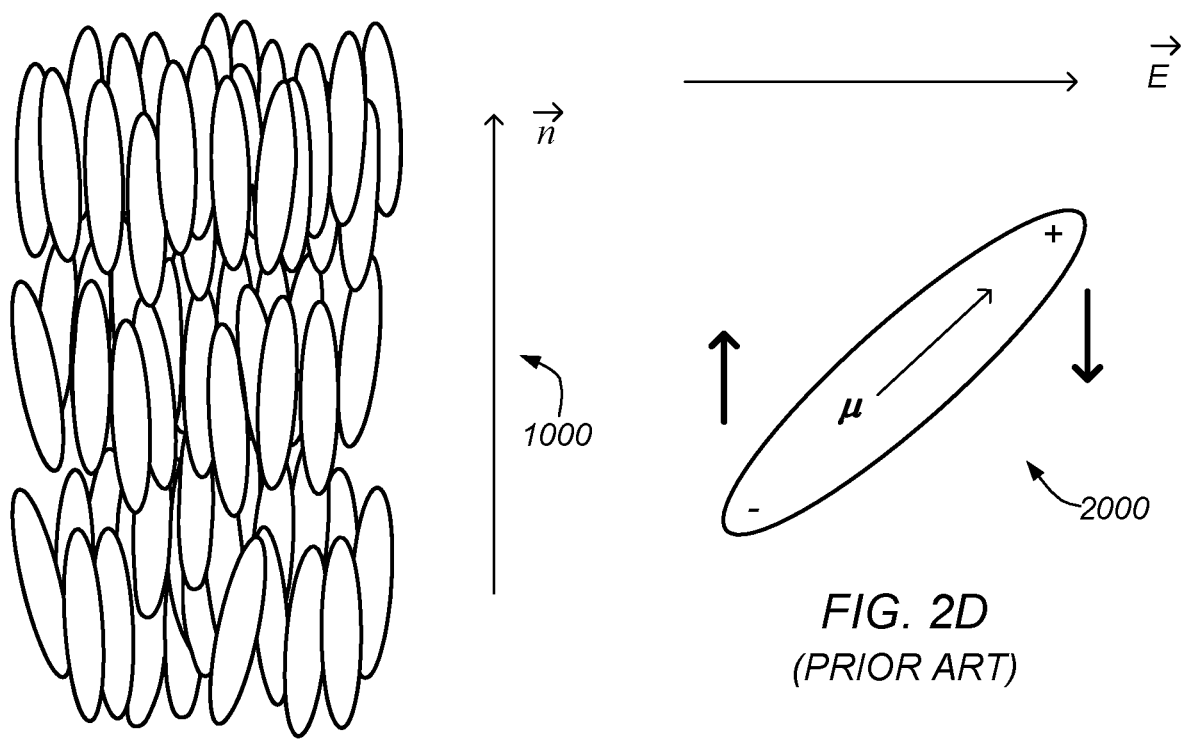
FIG. 2C
(PRIOR ART)
FIG. 2D
(PRIOR ART)
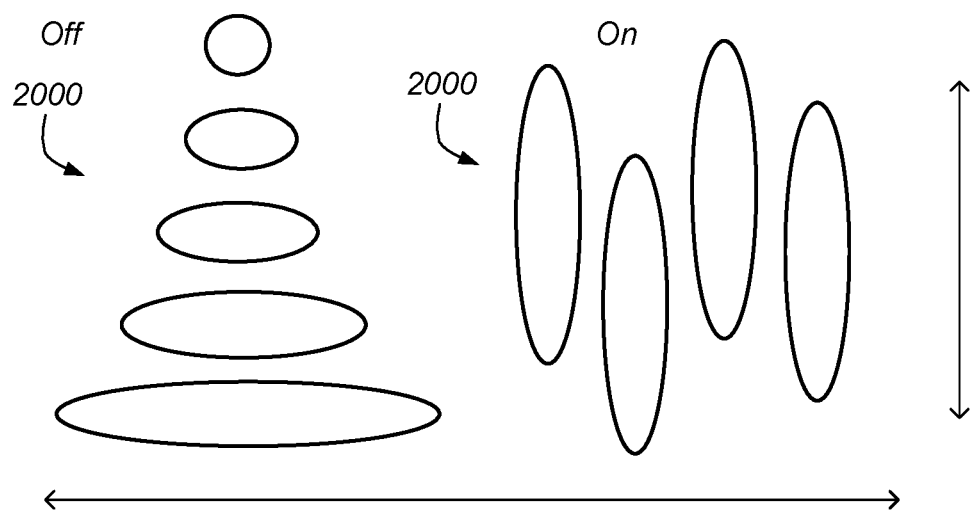
FIG. 2E
(PRIOR ART)

TRACKABILITY ENHANCEMENT OF A PASSIVE STYLUS

PRIORITY DATA

This application claims benefit of priority to U.S. Provisional Application Ser. No. 62/877,133, titled "Trackability Enhancement of a Passive Stylus", filed Jul. 22, 2019, which is hereby incorporated by reference in its entirety as though fully and completely set forth herein.

TECHNICAL FIELD

This disclosure relates to the field of digital display and more particularly to methods for enhancing trackability of a passive stylus within a three-dimensional display system.

DESCRIPTION OF THE RELATED ART

Three-dimensional (3D) displays (actually, simulated 3D, e.g., via stereoscopic display (SD) techniques) are increasingly utilized for a variety of applications, including, for example, remote viewing, videoconferencing, video collaboration, and so forth.

FIG. 1 illustrates a modern display chain, according to typical prior art embodiments, which includes the following components:

1. GPU—Graphics Processing Unit. This component resides on a personal computer, workstation, or functional equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.

2. Scaler—This component takes as input the video levels (e.g., for R, G, and B) for each pixel output from the GPU, and processes them in various ways, before outputting (usually) modified video levels for RGB, usually in the same 8-bit range of 0-255. This component may also scale an image from the input resolution to a different, rendered resolution supported by the display.

3. Panel—This component is the display itself, typically a liquid crystal display (LCD), though other displays are possible, and takes as input the video levels (e.g., for R, G and B) output from the scaler for each pixel, and converts the video levels to voltages, which are then delivered to each pixel on the display. The panel itself may modify the video levels before converting them to voltages.

The video chain generally modifies the video levels in two ways, specifically gamma correction and overdrive. Note that the functionality described above is typically implemented in the scaler, but is sometimes implemented at least partially in other devices or elements of the video chain, e.g., in the GPU or display device (panel).

Time Sequential Stereo Displays

Unlike a normal (i.e., monoscopic) display, in a stereo display, there are two images for each video frame: right and left. The right image must be delivered to only an observer's right eye, and the left image must be delivered to only the observer's left eye. In a time sequential stereo display, this separation of right and left images is performed in time, i.e., the left and right images are presented sequentially, and thus, contains some time-dependent element which separates these two images. There are two common architectures for stereo displays.

The first architecture uses a device called a polarization switch (PS), which may be a distinct (i.e., separate) or integrated LC device or other technology switch and which is placed in front of the LCD panel (or any other type of imaging panel, such as an OLED (organic light emitting diode) panel, a plasma display, etc.) or any other pixelated panel display used in a time-sequential stereo imaging system. Specifically, the PS switch may be placed between the display panel and the viewer, as shown in FIG. 2A. The purpose of the PS is to switch the light transmitted from the display panel between two orthogonal polarization states. For example, one of these states may be horizontally linearly polarized light (i.e., the light may be in a horizontal linear polarization state), and the other may be vertically linearly polarized light (i.e., the light may be in a vertical linear polarization state); however, other options are possible (e.g., left and right circular polarization states, etc.). The key feature that allows the PS to deliver the correct image to the correct eye of the viewer (i.e., the left image to the left eye and the right image to the right eye) is that the two polarization states are orthogonal to each other.

This architecture allows achievement of the stereo effect shown in prior art FIG. 2B. As may be seen, the top portion of the figure shows the (display) panel switching between a left image and a right image. Synchronous with the panel switching, the PS is switching the light being transmitted between a left state and a right state, as shown. These two states emit two corresponding orthogonal polarization states, as explained above. As FIG. 2B further shows, the system includes stereoscopic eyewear that is designed such that the left lens will only pass the left state polarization and the right lens will only pass the right state polarization. In this way, separation of the right and left images is achieved.

The second conventional architecture uses stereoscopic shutter glasses, which replace (or integrate the functionality of) the PS and eyewear. In such systems, each eye is covered by an optical shutter, which can be either open or closed. Each of these shutters is cycled between opened and closed synchronously with the display panel in such a way that when the left image is shown on the display, only the left eye shutter is open, and when the right image is shown on the display, only the right eye shutter is open. In this manner, the left and right views are alternatingly presented to the user's left and right eye, respectively. The alternate presentation of left and right views to the user's left and right eyes creates the perception of visual depth. Virtual objects may be displayed in this created 3D space, which exists both above the 3D stereoscopic display panel (i.e., negative space) and below the stereoscopic display panel (i.e., positive space).

Liquid Crystal Displays (LCDs)

Some of the advantages of a liquid crystal display (LCD) include lighter weight, lower power consumption, and less radiation contamination. LCD monitors have been widely applied to various portable information products (e.g., user equipment devices such as laptops, tablets, mobile phones, PDAs, and so forth). Typically, in an LCD monitor, incident light produces different polarization or refraction effects when the alignment of liquid crystal molecules is altered. The liquid crystal molecules affect the transmission of the incident light, and thus a magnitude of the light emitted from the liquid crystal molecules varies. The LCD monitor utilizes the characteristics of the liquid crystal molecules to control the corresponding light transmittance and produces images per different magnitudes of red, blue, and green light.

A schematic image of a nematic liquid crystalline phase 1000 is shown in FIG. 2C. The liquid crystal materials have no positional long-range ordering of their molecules' centers of mass, as in crystals. However, the liquid crystal materials possess long-range orientational ordering of their molecules along a main axis direction (in the simplest case of so-called nematic liquid crystal), effectively allowing the molecules to be aligned along one preferred direction, called the director of the liquid crystal, $\vec{n}$ (see FIG. 2C).

Liquid crystal molecules either possess a permanent dipole moment, or acquire the induced dipole moment when placed in an electric field. In both cases, in the electric field a liquid crystal molecule 2000 is characterized by some dipole moment, $\mu$. This dipole may be aligned along the molecule's symmetry axis (such materials are said to have the positive dielectric anisotropy) or perpendicular to it (the negative dielectric anisotropy). The separation of charge in a molecule leads to its rotation in the electric field until it is aligned parallel or perpendicular to the applied field, depending on a sign of the material's dielectric anisotropy. FIG. 2D depicts such re-orientation of a liquid crystal molecule with the positive dielectric anisotropy.

As all of the molecules in the liquid crystalline phase are subject to the re-orientation under the effect of the electric field at the same time, it is possible to control the symmetry axis of the phase (the director) and usually the optical axis of the liquid crystalline sample.

FIG. 2E illustrates the configuration of liquid crystal molecules within a conventional twisted nematic liquid crystal based polarization rotator. The nematic liquid crystal is chosen to have a positive dielectric anisotropy. The left-hand side of the figure illustrates the voltage OFF, 90-degree rotation state. The right-hand side of the figure illustrates the voltage ON, 0-degree rotation state.

Depending on the type of the liquid crystal cell and the relative orientations of the liquid crystal cell's optical axis and the polarizers' transmission axis, the polarization rotator can operate in either Normal White (NW) or Normal Black (NB) mode. These modes are governed by the optical transmission in the zero or low-voltage state, i.e. the Normal White mode corresponds to the maximum optical transmission in the zero or low-voltage state, and the minimum transmission in the high-voltage state; it is the opposite for the Normal Black mode.

The twisted nematic polarization rotator usually operates in the Normal White mode. In this case the higher applied voltage improves the contrast ratio of the Normal White mode due to the decrease of the residual retardance of a liquid crystal cell.

Other type of polarization rotators such as electrically controlled birefringence (ECB) mode can operate both in Normal White and Normal Black modes. Using additional optical elements in the 3D system (such as two orthogonal polarizers), the same polarization rotator can operate in both modes alternately in each frame.

SUMMARY

Various embodiments of systems for implementing methods for enhancing trackability of a passive stylus are described herein. In some embodiments a system may include one or more displays and at least one processor coupled to (or in communication with) the one or more displays. In some embodiments, the one or more displays and at least one processor may be comprised in and/or in communication with a head mounted display system. In some embodiments, the system may include a tracking system communicatively coupled to the at least one processor as well as a memory communicatively coupled to the at least one processor. In some embodiments, the tracking system may include one or multiple cameras. The at least one processor may be configured to perform or implement embodiments of the techniques disclosed herein. Additionally, a method implementing embodiments of the techniques disclosed herein may be implemented on a computer system or stored as program instructions on a computer readable memory medium. In some embodiments, the computer system may comprise a mobile device, such as a user equipment device (UE).

In some embodiments, a six degree of freedom (6DoF) location and orientation of a passive stylus may be tracked by a tracking system via a retroreflector system disposed on the passive stylus. Additionally, characteristic movements of one of a user's finger, hand, and/or wrist may be recognized by the tracking system. The passive stylus may be used to interact with a virtual 3D scene being displayed via a 3D display. A user input via the passive stylus may be determined based on the tracked 6DoF location and orientation of the passive stylus and/or the recognized characteristic movements. In some embodiments, the retroreflector system may include multiple patterns of retroreflectors. In some embodiments, one of the patterns may be a spiral pattern of retroreflectors disposed along a longitudinal axis of the passive stylus.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description of the preferred embodiment is considered in conjunction with the following drawings, in which:

FIG. 2C illustrates an example of a schematic diagram of a nematic liquid crystalline phase, according to implementations.

FIG. 2D illustrates an example of a schematic diagram of a switching of a liquid crystal molecule in an electric field, according to implementations.

FIG. 2E illustrates an example of a schematic diagram of a configuration of liquid crystal molecules within a conventional twisted nematic liquid crystal based polarization rotator, according to implementations.

Figure 1:
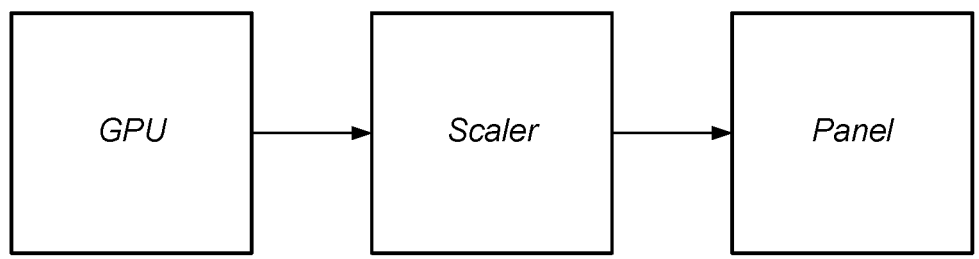
FIG. 1 illustrates a modern display chain, according to implementations.
Figure 2A:
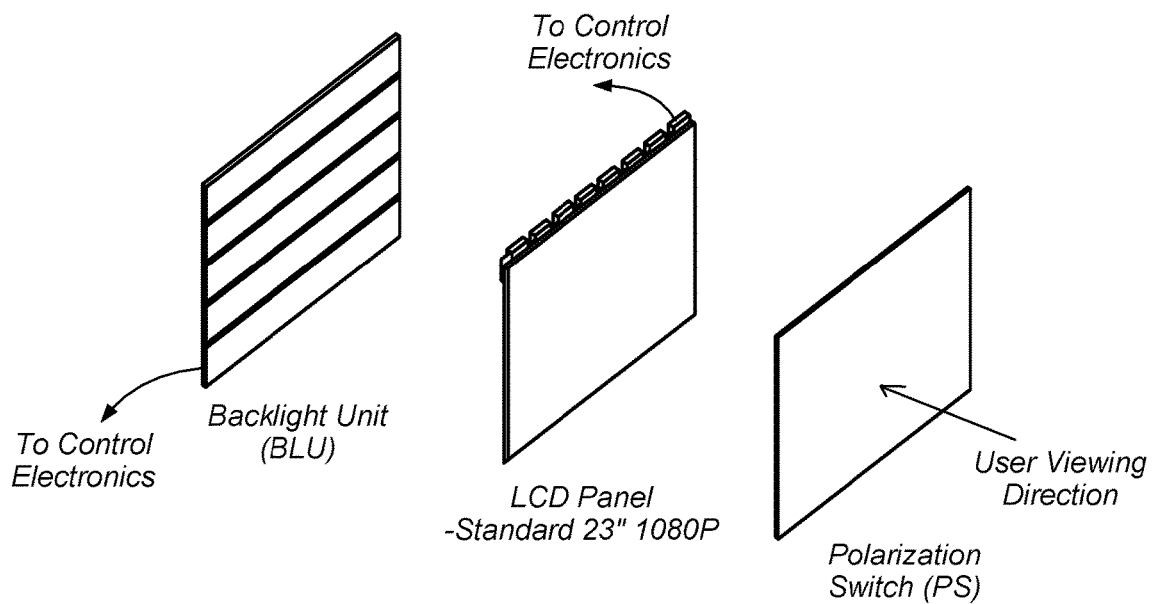
FIG. 2A illustrates an example of an architecture that utilizes a polarization switch, according to implementations.
Figure 2B:
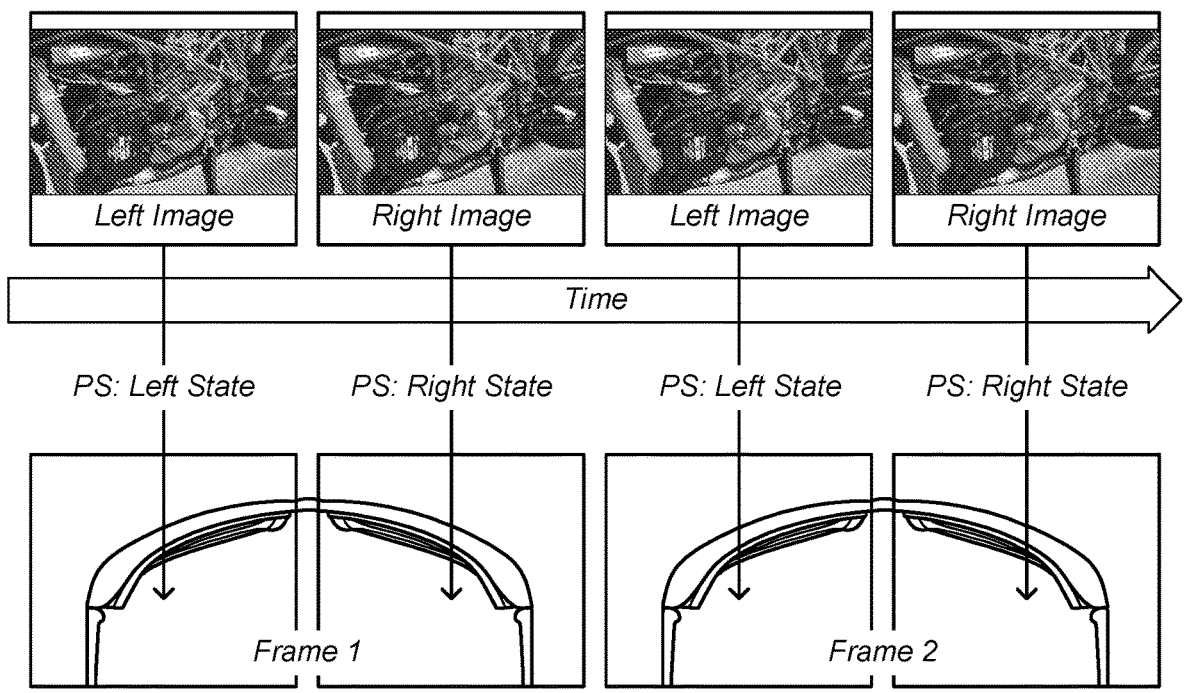
FIG. 2B illustrates an example of a stereo effect (simulated 3D) using polarization switching between left and right views, according to implementations.

While the disclosure is susceptible to various modifications and alternative forms, specific embodiments thereof are shown by way of example in the drawings and are herein described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Terms

The following is a glossary of terms used in the present application:

Memory Medium—any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, EEPROM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, tablet, or other device or combinations of devices. In general, the term "computer system" can be broadly defined to encompass any device (or combination of devices) having at least one processor that executes instructions from a memory medium.

Graphical Processing Unit—refers to a component that may reside on a personal computer, workstation, server, graphics server, or equivalent, and outputs video levels for each color or channel of a supported color model, e.g., for each of three colors, typically Red (R), Green (G), and Blue (B), for each pixel on the display. Each of these numbers is typically an 8-bit number, with a range of 0 to 255, although other ranges are possible.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element (or Functional Unit)—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Coupled Zone—refers to a physical volume in which the user of a 3D stereoscopic display can view 3D content within the human eye's natural depth of field. For example, when a person sees an object in the physical world, the person's eyes converge on, or look (individually aim) at, the object. Additionally, as the two eyes converge on the object, each eye's lens also focuses, via accommodation, (monoscopically) on the object. In this sense, both eyes focus and converge on the object, thus focus and convergence are "coupled."

Disparity—refers to the difference between the left eye and right eye images of a 3D stereoscopic display. Disparity may be described in at least two ways. First, with respect to the display device, i.e., the 3D stereoscopic display, disparity may be described by the number of pixels of separation between corresponding positions of the image, or content, being displayed, or rendered. In other words, the pixels of separation between the left eye and right eye images, or content. Alternatively, or in addition to, with respect to the point of view of the user, disparity may be described by the degree of angular separation between corresponding positions in the images, or content, being displayed, or rendered, i.e., the angular separation between the left eye and right eye images, or content.

Projection—refers to the display of a 3D object, or content, on a two-dimensional (2D) display. Thus, a projection may be described as the mathematical function applied to objects within a virtual 3D scene to determine the virtual position of the objects within a 3D space that may be defined by the size of the 3D stereoscopic display and the point of view of a user.

Viewpoint—This term has the full extent of its ordinary meaning in the field of computer graphics/cameras and specifies a location and/or orientation. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint (see below) or "physical viewpoint". The term "virtual viewpoint" refers to a viewpoint from within a virtual representation or 3D scene. A viewpoint is synonymous with "point of view" (POV). (See definition of POV below.)

Eyepoint—the physical location (and/or orientation) of a single eye or a pair of eyes. A viewpoint above may correspond to the eyepoint of a person. For example, a person's eyepoint has a corresponding viewpoint.

Point of View (POV)—refers to or specifies a position and orientation. For example, a POV may be a viewpoint or eyepoint, generally of a user, but may also be a viewpoint of an optical device, such as a camera. The POV is generally a means to capture a relationship between two or more 6 degree of freedom objects. In a typical application of the present techniques, a user's pair of eyes or head (view) is positioned in any X, Y, Z position and/or pitch, yaw, roll orientation to a display device, e.g., a monitor screen, which may have its own position in any X, Y, Z position and/or pitch, yaw, roll orientation. In this example, the POV can be defined as the position/orientation of the user's view with respect to the positioning/orientation of the display device. The POV determination may be identified by a capture system. In a typical application of the present techniques, one or more tracking devices are attached to the display device, such that the controller knows what the tracking system tracks in the context of the display device, meaning the tracking system, being attached to the display device, is programmatically aware of the position/orientation of the display device, as well as any potential change to the position/orientation of the display device.

The tracking system (which may identify and track, among other things, the user's view) may identify the position/orientation of the user's view, and this information may then be correlated to the tracking system's identification of the viewing device's position/orientation (again, with respect to the display device).

Vertical Perspective—a perspective effect rendered from a viewpoint which is substantially perpendicular to the display surface. "Substantially perpendicular" refers to 90 degrees or variations thereof, such as 89 or 91 degrees, 85-95 degrees, or any variation which does not cause noticeable distortion of the rendered scene. A vertical perspective may be a central perspective, e.g., having a single (and central) vanishing point. As used herein, a vertical perspective may apply to a single image or a stereoscopic image. When used with respect to a stereoscopic image (e.g., presenting a stereoscopic image according to a vertical perspective), each image of the stereoscopic image may be presented according to the vertical perspective, but with differing single viewpoints.

Horizontal or Oblique Perspective—a perspective effect rendered from a viewpoint which is not perpendicular to the display surface. More particularly, the term "horizontal perspective" may typically refer to a perspective effect which is rendered using a substantially 45-degree angled render plane in reference to the corresponding viewpoint. The rendering may be intended for a display which may be positioned horizontally (e.g., parallel to a table surface or floor) in reference to a standing viewpoint. "Substantially 45 degrees" may refer to 45 degrees or variations thereof, such as 44 and 46 degrees, 40-50 degrees, or any variation which may cause minimal distortion of the rendered scene. As used herein, a horizontal perspective may apply to a single image or a stereoscopic image. When used with respect to a stereoscopic image (e.g., presenting a stereoscopic image according to a horizontal perspective), each image of the stereoscopic image may be presented according to the horizontal perspective, but with differing single viewpoints.

Another conception of the horizontal perspective as commonly used in embodiments of the present techniques relates to the projection of the intended rendered graphics to the viewing device. With the POV determined, a horizontal perspective engine may identify the correct graphics frustum in the 3D space, taking into account the position and orientation of the viewing device as defining the render plane of the frustum and the user's view in position and orientation to define a camera point of the frustum in relation to the render plane. The resultant projection is then rendered onto the viewing device as will be seen by the user.

Position—the location or coordinates of an object (either virtual or real). For example, position may include x, y, and z (i.e., location) coordinates within a defined space. The position may be relative or absolute, as desired. Position may also include yaw, pitch, and roll information, e.g., when defining the orientation of a viewpoint. In other words, position is defined broadly so as to encompass information regarding both location and orientation.

Passive Stylus—a peripheral device or element such as a handheld device, handheld pen device, handheld pointing device, hand, finger, glove, or any object used to directly interact with rendered virtual objects as in a stereo rendered virtual projected objects.

Active Stylus—a peripheral device or element that provides additional capabilities to improve accuracy and precision in the determination of a position of the active stylus. These capabilities may include one or more of accelerometers, magnetometers, gyroscopes, global positioning system, compass, and/or gravity sensor. Examples include a handheld device, handheld pen device, handheld pointing device, and/or any object that includes such capabilities and is used to directly interact with rendered virtual objects as in a stereo rendered virtual projected objects.

Similar—as used herein in reference to geometrical shapes, refers to the geometrical term indicating that objects have the same shape, or that one object has the same shape as the mirror image of the other object. In other words, objects are considered similar if one object may be obtained from the other by uniformly scaling (enlarging or shrinking) the object. Additionally, the term similar, or similar objects, means that either object may be rescaled, repositioned, and reflected, so as to coincide with the other object. Thus, for example, if a first object is geometrically similar to a second object, i.e., has the same shape but possibly a different size, then either object may be uniformly scaled to obtain the geometrical size and shape of the other object. Thus, the first object may be uniformly scaled to obtain the second object or the second object may be uniformly scaled to obtain the first object. Note that this definition of similar only refers to the use of the word in the context of geometrical shapes and retains it ordinary meaning in other contexts (e.g., system A is similar to system B implies that system A resembles system B without being identical to system B).

Approximately—refers to a value that is correct or exact within some specified tolerance. For example, approximately may refer to a value that is within 1 to 10 percent of the exact (or desired) value. It should be noted, however, that the actual threshold value (or tolerance) may be application dependent. For example, in one embodiment, "approximately" may mean within 0.1% of some specified or desired value, while in various other embodiments, the threshold may be, for example, 2%, 3%, 5%, and so forth, as desired or as required by the particular application.

Proximate—near to; for example, proximate may mean within some specified distance, or within some specified fraction of a distance. Note that the actual threshold for being proximate is generally application dependent. Thus, in various applications, proximate may mean being within 1 mm, 1 inch, 1 foot, 1 meter, 1 mile, etc. of some reference point or object, or may refer to being within 1%, 2%, 5%, 10%, etc., of a reference distance from some reference point or object.

Substantially—refers to a term of approximation. Similar to the term "approximately," substantially is meant to refer to some tolerable range. Thus, if part A is substantially horizontal, then part A may be horizontal (90 degrees from vertical), or may be within some tolerable limit of horizontal. For example, in one application, a range of 89-91 degrees from vertical may be tolerable, whereas, in another application, a range of 85-95 degrees from vertical may be tolerable. Further, it may be that the tolerable limit is one-sided. Thus, using the example of "part A is substantially horizontal," it may be tolerable for Part A to be in a range of 60-90 degrees from vertical, but not greater than 90 degrees from vertical. Alternatively, it may be tolerable for Part A to be in a range of 90-120 degrees from vertical but not less than 90 degrees from vertical. Thus, the tolerable limit, and therefore, the approximation referenced by use of the term substantially may be as desired or as required by the particular application.

Equivalent—refers to an object that is equal to or corresponds with another object in value, measure, function, meaning, effect, significance, appearance, and so forth. For example, a first image may be equivalent to a second image if imagery within the first image corresponds to imagery within the second image. Additionally, a first image may be substantially equivalent to a second image if imagery within the first image at least partially corresponds to imagery with the second image, e.g., within some tolerable range and/or limit.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Comprising—this term is open-ended, and means "including."". As used in the appended claims, this term does not foreclose additional elements, structure, or steps. Consider a claim that recites: "A system comprising a display . . . "; such a claim does not foreclose the system from including additional components (e.g., a voltage source, a light source, etc.).

Configured To—various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/ circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue.

First, Second, etc.—these terms are used as labels for nouns that they precede, and do not imply any type of ordering (e.g., spatial, temporal, logical, etc.). For example, in a system having multiple tracking sensors (e.g., cameras), the terms "first" and "second" sensors may be used to refer to any two sensors. In other words, the "first" and "second" sensors are not limited to logical sensors 0 and 1.

Based On—this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

This specification may include references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

FIGS. 3-6 Exemplary Systems

Figure 3A:
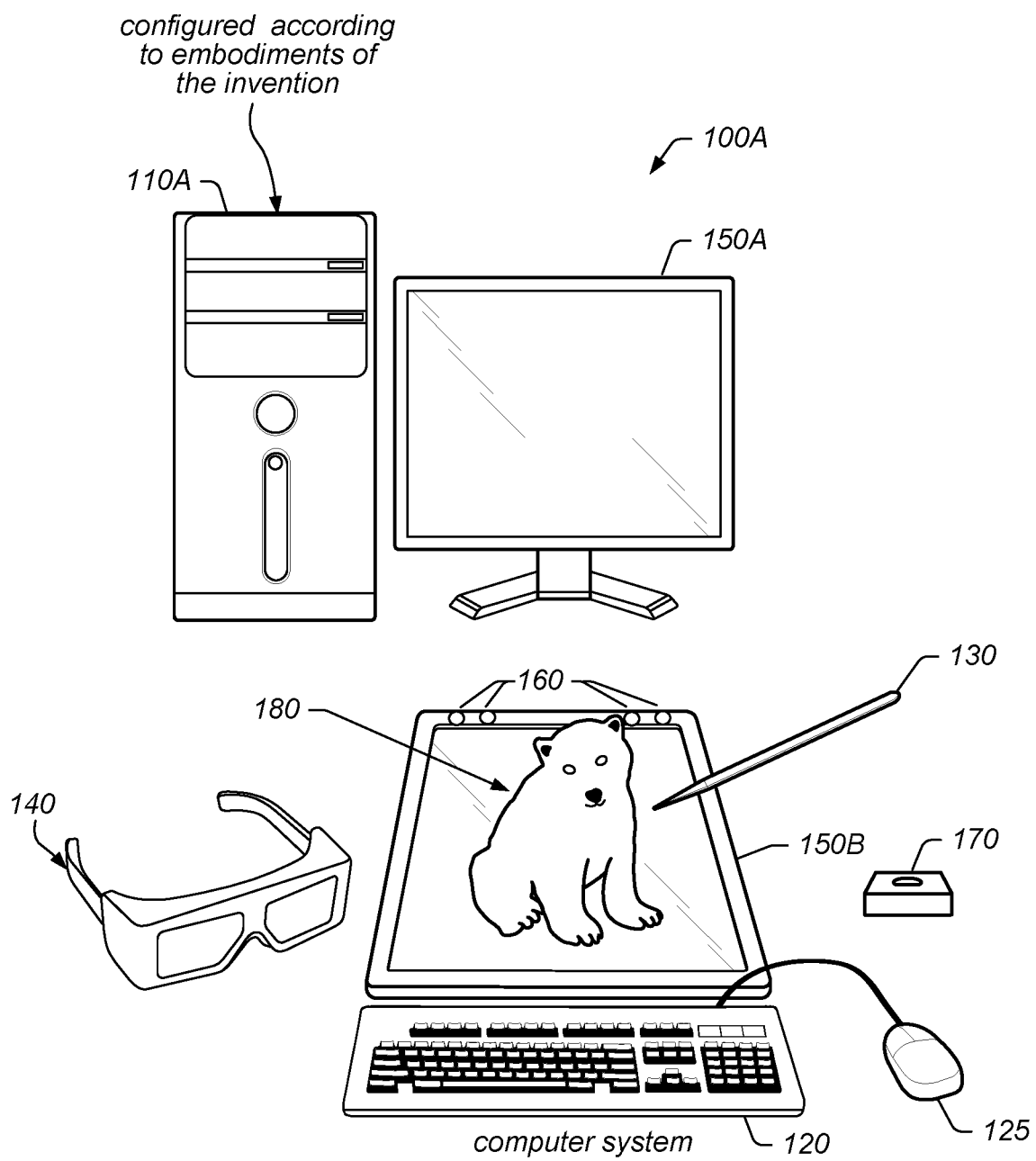
FIGS. 3A and 3B illustrate examples of 3D stereoscopic display systems configured according to some embodiments.
Figure 3B:
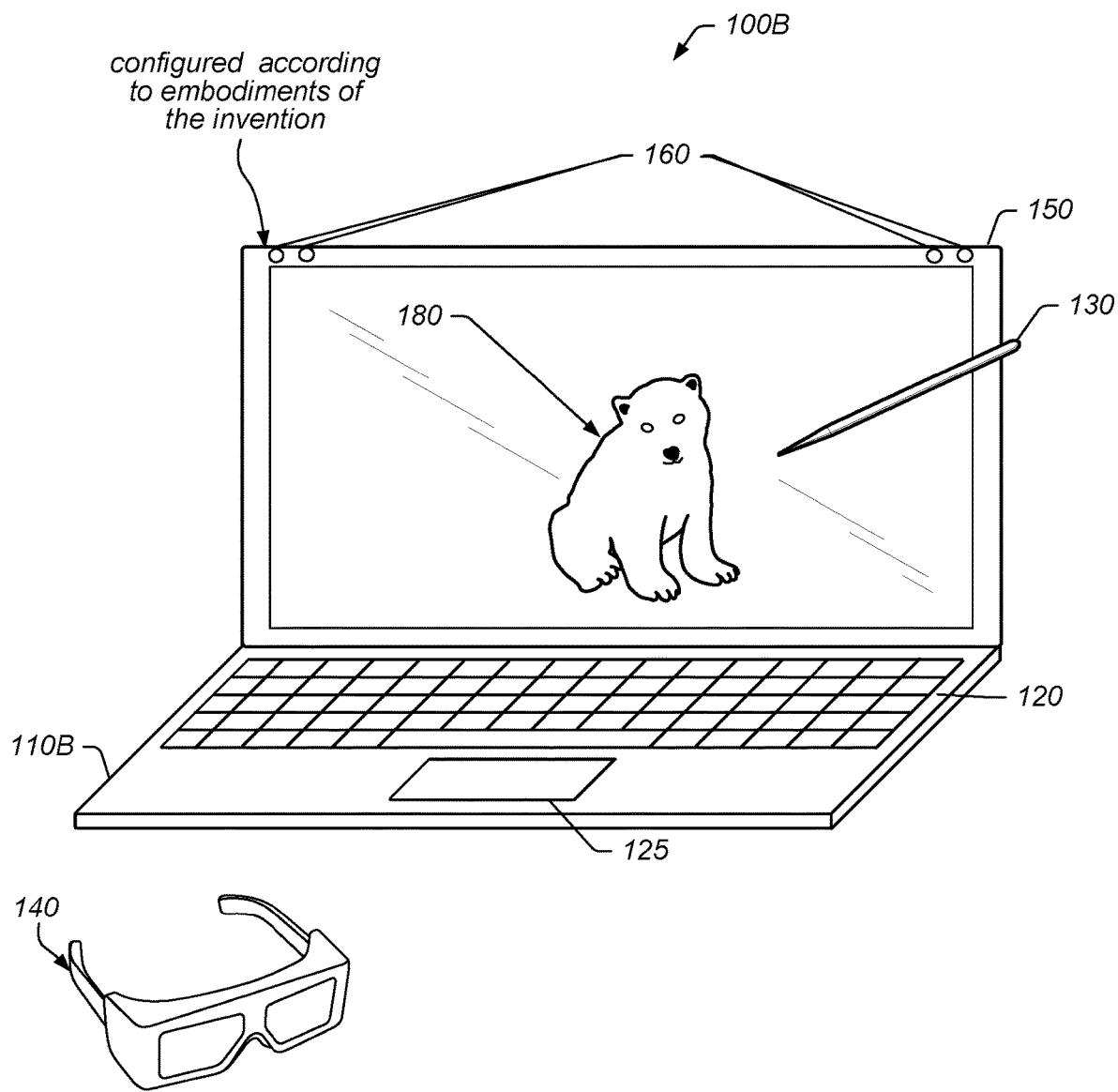

FIGS. 3A and 3B illustrate exemplary systems configured to implement various embodiments of the techniques described below.

In the exemplary embodiment of FIG. 3A, computer system 100A may include chassis 110A, display 150A and display 150B (which may collectively be referred to as display 150 or "one or more displays" 150), keyboard 120, mouse 125, user input device 130, eyewear 140, at least two cameras 160, and caddy 170. Note that in some embodiments, two displays 150A and 150B may not be used; instead, for example, a single display 150 may be used. In various embodiments, at least one of the displays 150A and 150B may be a stereoscopic display. For example, in one embodiment, both of the displays 150A and 150B may be stereoscopic displays. Or, in other embodiments, the single display 150 may be a stereoscopic display. It is noted that a stereoscopic display may also be configured to display two-dimensional (2D) objects and may be configured to operate in a 2D mode.

The chassis 110A may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100A may be configured to display a three-dimensional (3D) scene (e.g., via stereoscopic images), or 3D content, such as scene 180, using the display 150A and/or the display 150B. The computer system 100A may also be configured to display a "view" of the 3D scene using the display 150A, the display 150B, and/or another display, as described in more detail below. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

It should be noted that the embodiment of FIG. 3A is exemplary only, and other numbers of displays are also envisioned. For example, the computer system 100A may include only a single display or more than two displays, or the displays may be arranged in different manners than shown, e.g., as goggles or other wearable eyewear or headgear as further described below in reference to FIG. 5. In this particular embodiment, the display 150A is configured as a vertical display (which may be perpendicular or approximately perpendicular to a user's line of sight) and the display 150B is configured as a horizontal display (which may be parallel (or approximately parallel) or oblique to a user's line of sight). The vertical display 150A may be used (e.g., via instructions sent by a graphics engine executing in the chassis 110A) to provide images which are presented according to a vertical (or central) perspective and the display 150B may be used (e.g., via instructions sent by a graphics engine executing in the chassis 110A) to provide images that are presented according to a horizontal perspective. Descriptions of horizontal and vertical perspectives are provided herein (see, e.g., the above Terms section). Additionally, while the displays 150 are shown as flat panel displays, in other embodiments, they may be any type of device or system which is capable of displaying images, e.g., projection systems. For example, display(s) 150 may be or include a CRT (cathode ray tube) monitor, a LCD (liquid crystal display) monitor, or a front projection or a back projection screen or surface with a plurality of projectors, among others. Display(s) 150 may include a light emitting diode (LED) backlight or other type of backlight.

Either or both of the displays 150A and 150B may present (display) stereoscopic images for viewing by the user. By presenting stereoscopic images, the display(s) 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others. In some embodiments, the display(s) 150 may be included (or incorporated) in the eyewear (or other wearable headgear). In embodiments using anaglyph glasses, images for a first eye are presented according to a first color (and the corresponding lens has a corresponding color filter) and images for a second eye are projected according to a second color (and the corresponding lens has a corresponding color filter). With polarized glasses, images are presented for each eye using orthogonal polarizations, and each lens of the eyewear has the corresponding orthogonal polarization for receiving the corresponding image. With shutter glasses, each lens is synchronized with respect to left and right eye images provided by the display(s) 150, e.g., in alternating fashion. The display may provide both polarizations simultaneously or in an alternating manner (e.g., sequentially), as desired. Thus, the left eye may be allowed to only see left eye images during the left eye image display time and the right eye may be allowed to only see right eye images during the right eye image display time. With lenticular glasses, images form on cylindrical lens elements or a two-dimensional array of lens elements. The stereoscopic image may be provided via optical methods, where left and right eye images are provided only to the corresponding eyes using optical means such as prisms, mirror(s), lens(es), and the like. Large convex or concave lenses can also be used to receive two separately projected images to the user.

In one embodiment, eyewear 140 may be used as a position input device to track the user view (e.g., eyepoint or point of view (POV)) of a user viewing a 3D scene presented by the system 100A. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display(s) 150 and the point of view of the user may be used to map a portion of the virtual space to the physical space of the system 100A. In essence, the physical space and components used may be mapped to the virtual model in order to accurately render a 3D scene of the virtual space.

One or more of the user input devices (e.g., the keyboard 120, the mouse 125, the user input device 130, pointing device, user control device, user hand/fingers, etc.) may be used to interact with the presented 3D scene. For example, the user input device 130 (shown as a passive stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. For example, when the horizontal display 150B is used, the 3D scene may be seen as hovering above the horizontal display. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100A may include one or more sensors 160. The one or more sensors 160 may be included in a tracking system. FIG. 3 illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100A, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used to perform 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination. System 100A may also include a caddy 170 to store user input device 130. Caddy 170 may also be used to calibrate the orientation of the stylus to a known roll, pitch, and yaw, and so may be in a fixed position relative to cameras 160.

In one embodiment, the system 100A may be configured to couple to a network, such as a wide area network, via an input. The input may be configured to receive data (e.g., image data, video data, audio data, etc.) over the network from a system similar to system 100A. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110A to determine a position or a POV, e.g., via execution of one more programs by or on a processor or functional unit of chassis 110A, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display(s) 150. A view of the 3D scene may be presented based on the virtual viewpoint, either by one or more of the display(s) 150 or another display, as desired. This view of the 3D scene may be stereoscopic or monoscopic, as desired.

A 3D scene generator (e.g., content processing system) stored and executed in the chassis 110A may be configured to dynamically change the displayed images provided by the display(s) 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110A.

Thus, the system 100A may present a 3D scene with which the user may interact in real time. The system may include real-time electronic display(s) 150 that may present or convey perspective images in the open space, and user input device 130 that may allow the user to interact with the 3D scene with hand controlled or hand-held tools. The system 100A may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

Further, while the system 100A is shown as including horizontal display 150B because it simulates the user's visual experience with the horizontal ground, other viewing surfaces may offer similar 3D illusion experiences. For example, the 3D scene may appear to be hanging from a ceiling by projecting the horizontal perspective images onto a ceiling surface, or may appear to be floating from a wall by projecting horizontal perspective images onto a vertical wall surface. More generally, any other variations in display orientation and perspective (or any other configuration of the system 100A) may be used as desired.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device.

In the exemplary embodiment of FIG. 3B, computer system 100B may include chassis 110B which may include display 150, keyboard 120, trackpad or touchpad 135, and at least two cameras 160. The computer system 100B may also include user input device 130 and eyewear 140. Note that in some embodiments, computer system 100B may be wireless or mobile station, e.g., such as a wireless station 106 further described below. For example, computer system 100B may be or included on mobile telephones or smart phones (e.g., iPhone™, Android™-based phones), tablet computers (e.g., iPad™, Samsung Galaxy™, etc.), laptop computers (e.g., MacBook™), portable gaming devices (e.g., Nintendo DS™, PlayStation Portable™, Gameboy Advance™, iPhone™), portable Internet devices, and/or other handheld devices. In various embodiments, at least one of the display 150 may be a stereoscopic display. It is noted that a stereoscopic display may also be configured to display two-dimensional (2D) objects and may be configured to operate in a 2D mode.

The chassis 110B may include various computer components such as processors, at least one memory medium (e.g., RAM, ROM, hard drives, etc.), graphics circuitry, audio circuitry, and other circuitry for performing computer tasks, such as those described herein. The at least one memory medium may store one or more computer programs or software components according to various embodiments of the present invention. For example, the memory medium may store one or more graphics engines which are executable to perform some of the techniques described herein. In certain embodiments, the graphics engine may be implemented on or by a functional unit or processing element. As used herein, and as noted in the Terms section above, the term functional unit or processing element refers to any of various elements or combinations of elements configured to process instructions and/or data. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

The memory medium (which may include two or more memory mediums) may also store data (and/or program instructions) (e.g., implementing or specifying a computer model) representing a virtual space, which may be used for projecting a 3D scene, such as scene 180, of the virtual space via the display(s) 150. Further, the memory medium may store software which is executable to perform three-dimensional spatial tracking (e.g., user view tracking, user control tracking, etc.), content processing, or other features, as described herein. For example, the computer system may include a tracking system that may track one or more of a user's head, a user's hand, or the stylus. Additionally, the memory medium may store operating system software, as well as other software for operation of the computer system. Various embodiments further include receiving or storing instructions and/or data implemented in accordance with the foregoing description upon a carrier medium.

As indicated above, the computer system 100B (or more specifically, chassis 110B) may be configured to display a three-dimensional (3D) scene (e.g., via stereoscopic images), or 3D content, such as scene 180, using the display 150. The computer system 100B may also be configured to display a "view" of the 3D scene using the display 150. The "view" of the 3D scene, or content, may refer to a displayed portion of the 3D scene from a viewpoint within the 3D scene. A viewpoint within the 3D scene may be referred to as a "virtual viewpoint." The view may be stereoscopic, e.g., may be displayed on a stereoscopic display. Alternatively, the view may be monoscopic (not stereoscopic), and may be displayed on either a monoscopic display or a stereoscopic display. Note that a monoscopic image or scene displayed on a stereoscopic display may appear the same as on a monoscopic display system.

In some embodiments, the display 150 may present a 3D scene for the user. This 3D scene may be considered or referred to as an illusion or simulated 3D because the actual provided images are 2D, but the scene is conveyed in 3D via the user's interpretation of the provided images via stereoscopic effects. In order to properly view the stereoscopic images (one for each eye for each image frame), the user may wear eyewear 140. Eyewear 140 may be any of anaglyph glasses, polarized glasses, shutter glasses, lenticular glasses, etc., among others.

In some embodiments, eyewear 140 may be used as a position input device to track the user view (e.g., eyepoint or point of view (POV)) of a user viewing a 3D scene presented by the system 100B. For example, eyewear 140 may provide information (e.g., position information, which includes orientation information, etc.) that is usable to determine the position of the point of view of the user, e.g., via triangulation. In some embodiments, the position input device may use a light sensitive detection system, e.g., may include an infrared detection system, to detect the position of the viewer's head to allow the viewer freedom of head movement. Other embodiments of the input device(s) may use the triangulation method of detecting the viewer point of view location, such as one or more sensors (e.g., two cameras, such as charge coupled-device (CCD) or complementary metal oxide semiconductor (CMOS) cameras) providing position data suitable for the head tracking. The input device(s), such as a stylus, keyboard, mouse, trackball, joystick, or the like, or combinations thereof, may be manually operated by the viewer to specify or indicate the correct display of the horizontal perspective display images. However, any method for tracking the position of the user's head or point of view may be used as desired. Accordingly, the 3D scene may be rendered from the perspective (or point of view) of the user such that the user may view the 3D scene with minimal distortions (e.g., since it is based on the point of view of the user). Thus, the 3D scene may be particularly rendered for the point of view of the user, using the position input device.

The relationships among the position of the display 150 and the point of view of the user may be used to map a portion of the virtual space to the physical space of the system 100B. In essence, the physical space and components used may be mapped to the virtual model in order to accurately render a 3D scene of the virtual space.

One or more of the user input devices (e.g., the keyboard 120, the trackpad 135, the user input device 130, pointing device, user control device, user hand/fingers, etc.) may be used to interact with the presented 3D scene. For example, the user input device 130 (shown as a passive stylus) or simply the user's hands may be used to directly interact with virtual objects of the 3D scene (via the viewed projected objects). Such direct interaction may be possible with negative space portions of the 3D scene. In some embodiments, at least a portion of the 3D scene may be presented in this negative space, which is in front of or otherwise outside of the at least one display, via stereoscopic rendering (of the 3D scene). In some embodiments, at least a portion of the 3D scene may appear as a hologram-like image above the surface of the display 150. It should be noted, however, that a portion of the 3D scene may also be presented as appearing behind the display surface, which is in positive space Thus, negative space refers to a space which the user is able to freely move in and interact with (e.g., where the user is able to place his hands (or more generally, user input device 130) in the space), as opposed to a space the user cannot freely move in and interact with (e.g., where the user is not able to place his hands (or a user input device 130) in the space, such as below the display surface). Thus, negative space may be considered to be a "hands-on volume" as opposed to an "inner-volume" (i.e., positive space), which may be under the surface of the display(s), and thus not accessible. Thus, the user may interact with virtual objects in the negative space because they are proximate to the user's own physical space. Said another way, the positive space is located behind (or under) the viewing surface, and so presented objects appear to be located inside (or on the back side of) the physical viewing device. Thus, objects of the 3D scene presented within the positive space do not share the same physical space with the user and the objects therefore cannot be directly and physically manipulated by hands or physically intersected by hand-held tools such as user input device 130. Rather, they may be manipulated indirectly, e.g., via a computer mouse, a joystick, virtual representations of hands, handheld tools, or a stylus, or by projections from the stylus (e.g., a virtual laser or a virtual plane).

In some embodiments, system 100 may include one or more sensors 160. The one or more sensors 160 may be included in a tracking system. FIG. 3B illustrates an embodiment using four cameras 160. For instance, two of the four cameras 160 may be used to sense a user view (e.g., point of view) and the other two cameras 160 may be used to sense a user input device (e.g., pointing device, stylus, hand, glove, etc.). Alternatively, fewer than four sensors may be used (e.g., two sensors), wherein each sensor may track both the user (e.g., the user's head and/or the user's point of view) and the user input device. Sensors 160 may be used to image a user of system 100B, track a user's movement, or track a user's head or eyes, among other contemplated functions. In one embodiment, cameras 160 may track a position and/or an orientation of user input device 130. The information regarding the position (including the orientation) of the user input device 130 provided by the one or more sensors 160 may be used to perform 3D tracking of the user input device 130. The one or more sensors 160 may be spatially separated from one another and placed in a position to view a volume that encompasses where a user will view stereo imagery. Sensors 160 may also be far enough apart from each other to provide for a separation of view for a true three-axis triangulation determination.

In some embodiments, the system 100B may be configured to couple to a network, such as a wide area network, via an input or interface (wired or wireless). The input may be configured to receive data (e.g., image data, video data, audio data, etc.) over the network from a system similar to systems 100A or 100B. In other embodiments, a tracking system may include cameras 160. Cameras 160 may be configured to provide visual information regarding a user (e.g., such that a POV, e.g., the position (including the orientation), of the user may be determined or such that a position of the user's hand may be determined). However, it should be noted that any type of various tracking techniques or devices may be used as desired. Note that as used herein, POV of a user refers to the perspective or POV from which a user optically views an object or image, i.e., a user's visual POV, and thus is defined with respect to the display device of the system. In some embodiments, the POV may be a 6 degree of freedom (6DOF) POV, e.g., three location coordinates and three orientation coordinates, although any POV may be used as desired, e.g., three location coordinates and two or three orientation coordinates, and so forth. As noted above, position coordinates may include both location and orientation coordinates.

Note that in some embodiments, the tracking system may rely at least in part on the components of chassis 110B to determine a position or a POV, e.g., via execution of one more programs by or on a processor or functional unit of chassis 110B, although in other embodiments the tracking system may operate independently, e.g., may have its own processor or functional unit.

In certain embodiments, the system may include components implementing a perspective based image capture system, for capturing images of a target object at a location remote from the system. For example, the perspective based image capture system may include an input configured to couple to a network for receiving information regarding a point of view (POV) from a tracking system at a remote location. The information regarding the POV may indicate a position of a remote user. The perspective based image capture system may further include another image capture system for capturing images of a target object. More specifically, the image capture system may be configured to capture one or more images from a first perspective based on the information regarding the POV received by the input.

The user may be able to specify or otherwise manipulate a virtual viewpoint within the 3D scene presented by the display 150. A view of the 3D scene may be presented based on the virtual viewpoint, either by one or more of the display 150 or another display, as desired. This view of the 3D scene may be stereoscopic or monoscopic, as desired.

A 3D scene generator (e.g., content processing system) stored and executed in the chassis 110B may be configured to dynamically change the displayed images provided by the display 150. More particularly, the 3D scene generator may update the displayed 3D scene based on changes in the user view, user control (e.g., manipulations via the user input devices), etc. Such changes may be performed dynamically at run-time, and may be performed in real time. The 3D scene generator may also keep track of peripheral devices (e.g., user input device 130 or eyewear 140) to ensure synchronization between the peripheral device and the displayed image. The system may further include a calibration unit, procedure, and/or fiducial markers to ensure proper mapping of the peripheral device to the display images and proper mapping between the projected images and the virtual images stored in the memory of the chassis 110B.

Thus, the system 100B may present a 3D scene with which the user may interact in real time. The system may include real-time electronic display 150 that may present or convey perspective images in the open space, and user input device 130 that may allow the user to interact with the 3D scene with hand controlled or hand-held tools. The system 100B may also include means to manipulate the displayed image in various ways, such as magnification, zoom, rotation, or movement, or even to display a new image. However, as noted above, in some embodiments, the system may facilitate such manipulations via the user's hands, e.g., without hand-held tools.

According to various embodiments of the present disclosure, the display 150 may display various types of information (for example, multimedia data or text data) to be provided to the user. The display 150 may be configured to include a liquid crystal display (LCD), a light emitting diode (LED) display, an organic LED (OLED) display, a plasma cell display, an electronic ink array display, an electronic paper display, a flexible LCD, a flexible electrochromic display, or a flexible electro wetting display. The display 150 may be connected functionally to an element(s) of the electronic device. Also, the display 150 may be connected functionally to an electronic device(s) other than the electronic device. According to various embodiments of the present disclosure, the input module 240 may receive an input for controlling an attribute of, for example, a history screen. The input module 240 may receive, for example, an input of 'reference screen setting'. 'Reference screen setting' may involve an operation for storing information related to the screen in the storage module 210 in order to display the reference screen. The input module 240 may receive, for example, an input for displaying the reference screen. Attributes of the screen may include, for example, at least one of the position of the reference screen, a sound volume for the reference screen, brightness of the screen, and the size of the screen. If the input module 240 is included in a second electronic device, the input module 240 may not be provided in the electronic device according to various embodiments of the present disclosure.

Figure 4:
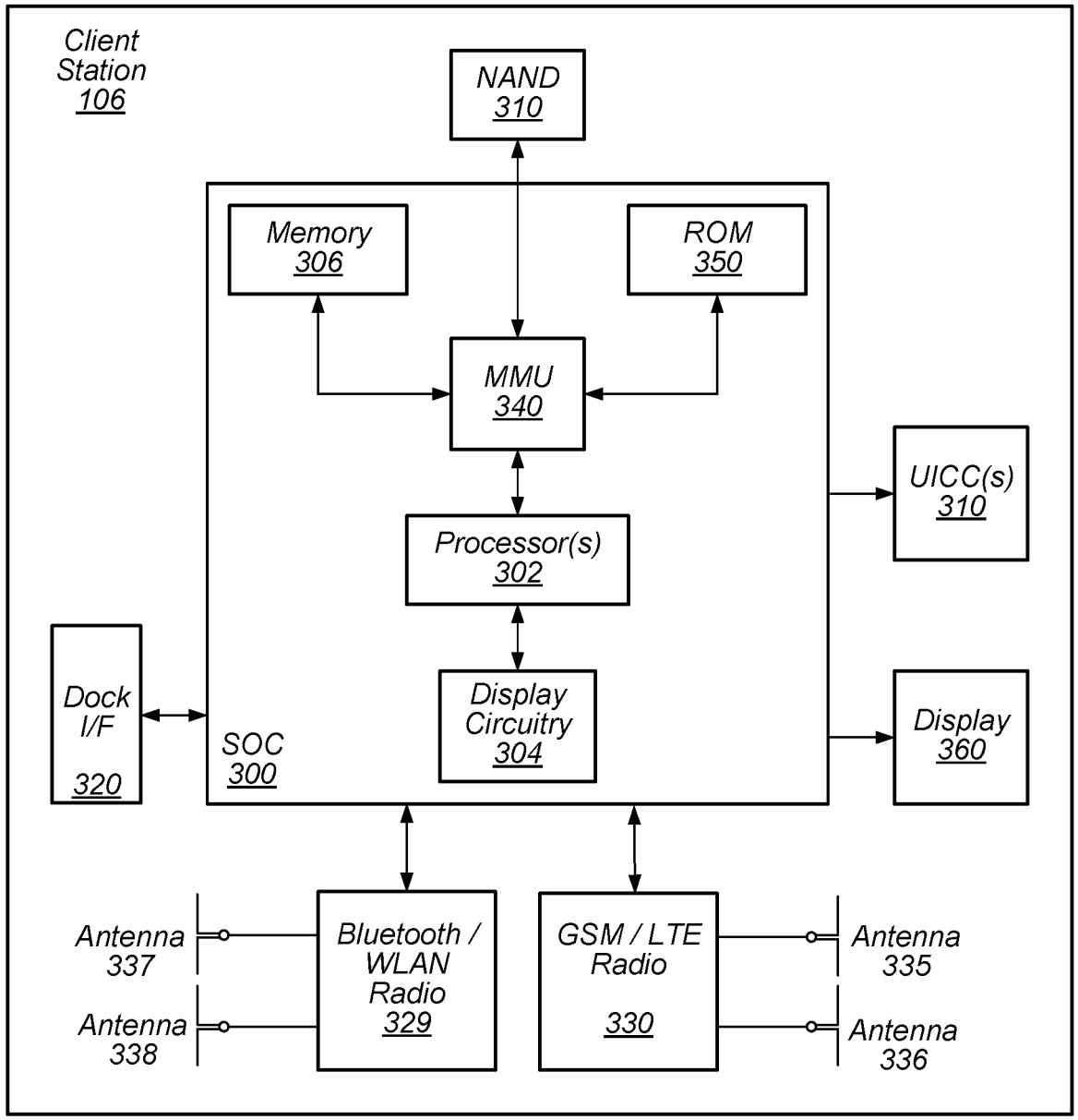
FIG. 4 illustrates an example block diagram of a user equipment device configured according to some embodiments.

FIG. 4 illustrates an example simplified block diagram of a wireless station 106. According to embodiments, wireless station 106 may be a user equipment (UE) device, a mobile device and/or mobile station. Wireless station 106 may be used in conjunction with the system described above in reference to FIGS. 3A and 3B and the systems described below in reference to FIGS. 5B and 5C. For example, wireless station 106 may be configured as an input device to any of the described systems (e.g., wireless station 106 may be configured as a user input device). As another example, according to some embodiments, wireless station 106 may be configured as a display of any of the described systems. Thus, wireless station 106 may be configured to display a stereoscopic image. In some embodiments, wireless station 106 may be configured to communicate with a 3D system either wirelessly (e.g., via a local area network such as a Wi-Fi, Bluetooth, or Bluetooth low energy connection) or via a wired interface such as a universal serial bus interface, among other wired interfaces. In some embodiments, wireless station 106 may be included in a computer system, such as computer system 100B described above.

As shown, the wireless station 106 may include a system on chip (SOC) 300, which may include portions for various purposes. The SOC 300 may be coupled to various other circuits of the wireless station 106. For example, the wireless station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The wireless station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the wireless station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As described herein, the wireless station 106 may include hardware and software components for implementing the features described herein, e.g., the wireless station 106 may form at least part of a 3D display system such as system 100 described above and/or systems 500A and 5B described below. For example, the processor 302 of the wireless station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Figure 5A:
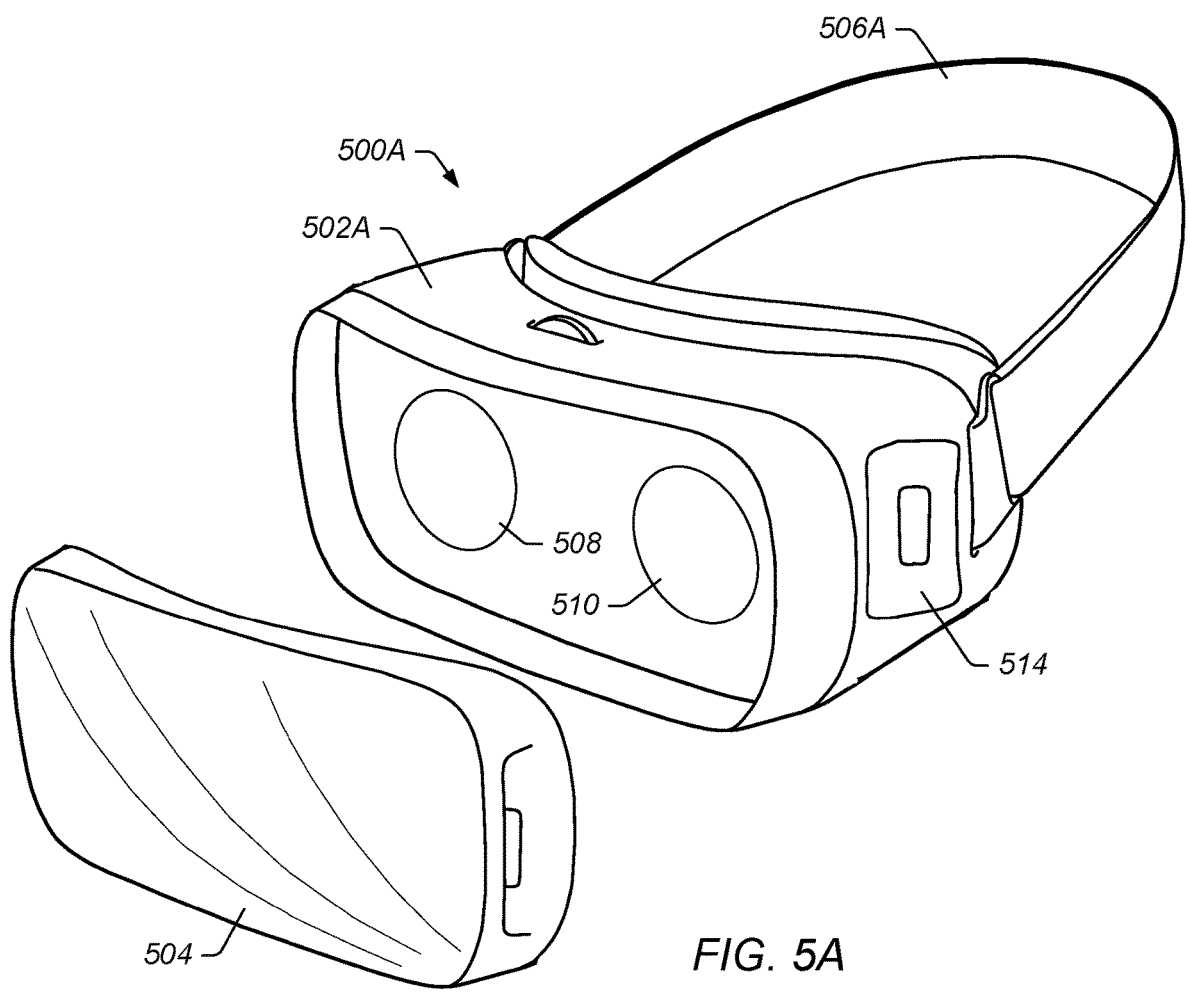
FIGS. 5A and 5B illustrate examples of a 3D head-mounted stereoscopic display system configured according to some embodiments.

Referring to FIG. 5A, a head-mounted electronic device 500A may include a body 502A and a cover 504. The body 502 may include lenses 508 and 510, and a control device 514. In addition, electronic device 500A may include a support 506A which may be configured to support electronic device 500A on a user's head. Lenses 508 and 510 may be positioned to correspond to eyes of a user. The user may view a screen on a display through lenses 508 and 510. The display may be coupled or connected to electronic device 500. In some embodiments, the display may be included on (or in) cover 504 and cover 504 may be configured to couple to body 502A. In some embodiments, electronic device 500B may include a display, such as display 150A or 150B described above in reference to FIG. 4. Thus, cover 504 may be communicatively coupled to body 502A (e.g., to couple a display of cover 504 to a processor of electronic device 500) and mechanically coupled (e.g., attached to) body 502. In some embodiments, the communicative coupling between body 502A and cover 504 may be wired and/or wireless.

In some embodiments, control device 514 may be located on a side surface of body 502A. Control device 514 may be used for the user to enter an input for controlling the head-mounted electronic device 500A. For example, control device 514 may include a touch panel, a button, a wheel key, and/or a touch pad. The touch panel may receive the user's touch input. The touch input may be a direct touch input to the touch panel or a hovering input in the vicinity of the touch panel.

Figure 5B:
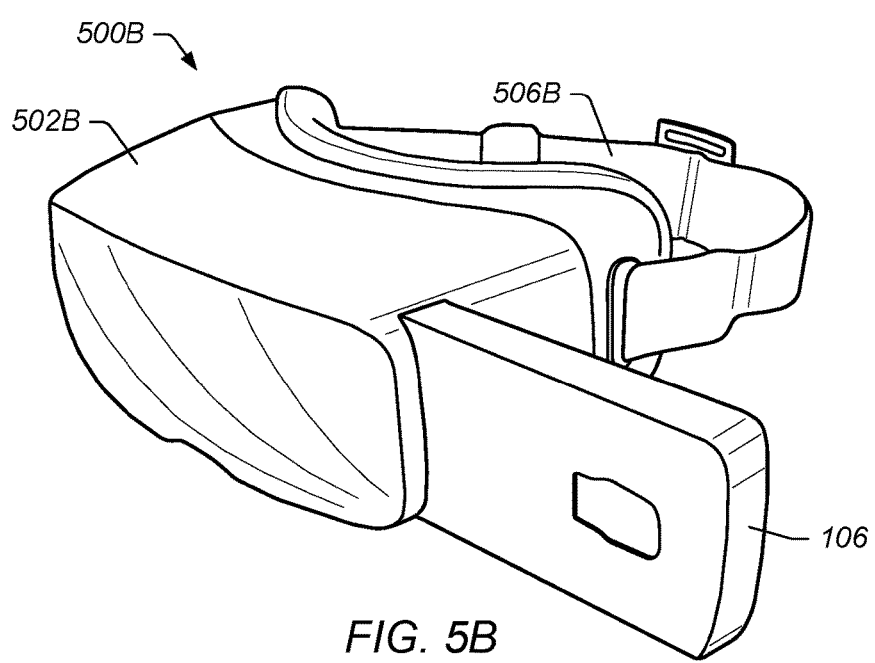

Turning to FIG. 5B, a head-mounted electronic device 500B may include a body 502B and a support 506B. Body 502B may be configured to couple to a wireless station and a display of electronic device 500B may be a display of a wireless station, such as wireless station 106, and the wireless station may be coupled or connected to (e.g., may be detachably mounted to) electronic device 500B. In other words, electronic device 500B may be configured such that a wireless station may be non-permanently coupled to, and removable without destructive measures, to electronic device 500B. Thus, electronic device 500B may be coupled to and decoupled from (e.g., non-destructively decoupled from) a wireless station without a change in functionality of the wireless station or electronic device 500B.

Figure 5C:
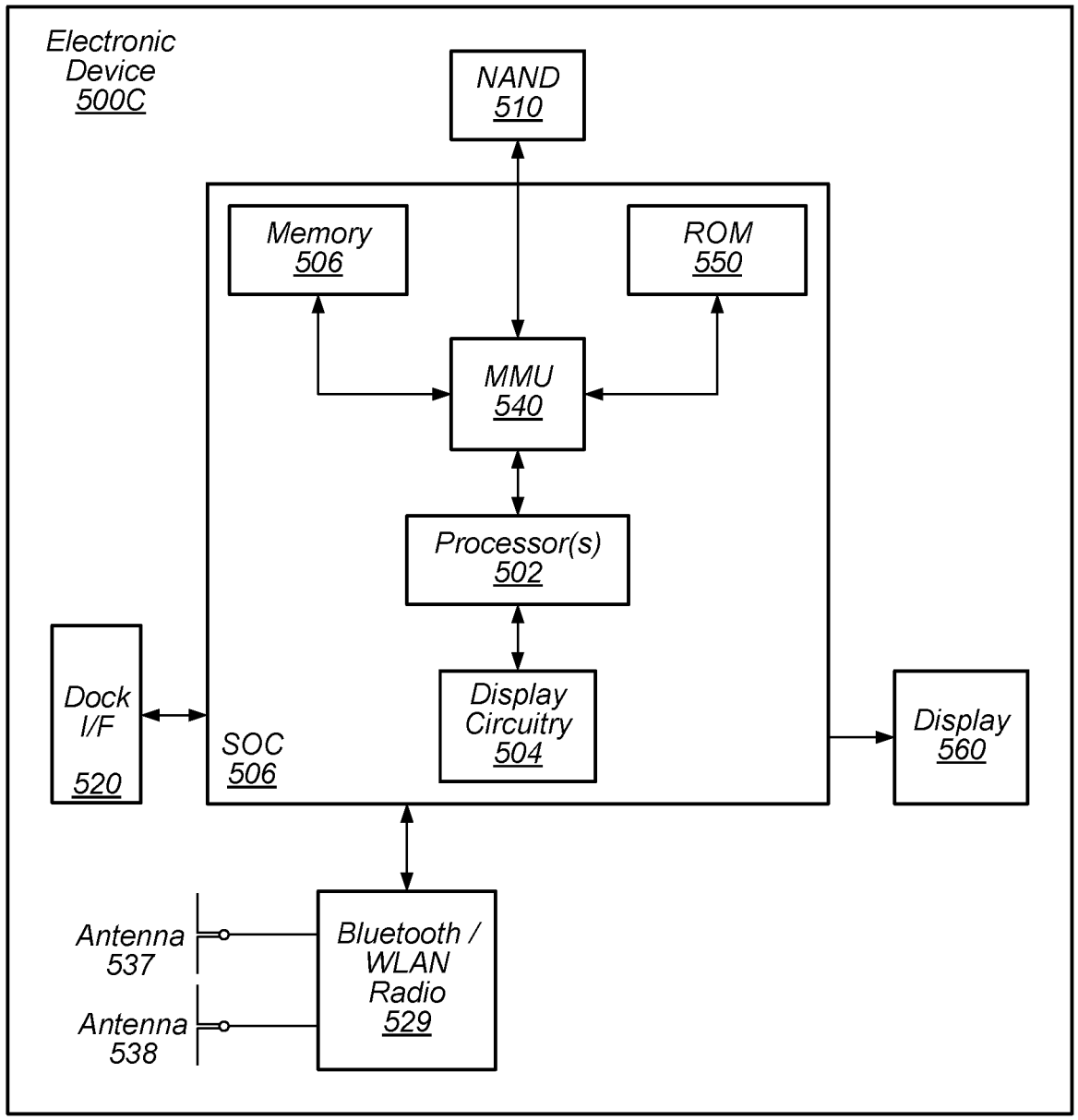
FIG. 5C illustrates an example block diagram of a head-mounted electronic device configured according to some embodiments.

Turning to FIG. 5C, FIG. 5C illustrates an example simplified block diagram of a head-mounted electronic device 500C. According to embodiments, electronic device 500C may be include a display (e.g., such as electronic device 500A) or may be configured to couple to wireless station (e.g., such as electronic device 500B). Note that electronic devices 500A and 500B described above may include at least portions of the features described in reference to electronic device 500C.

As shown, the electronic device 500C may include a system on chip (SOC) 506, which may include portions for various purposes. The SOC 506 may be coupled to various other circuits of the electronic device 500C. For example, the electronic device 500C may include various types of memory (e.g., including NAND flash 510), a connector interface (I/F) (or dock) 520 (e.g., for coupling to a computer system, dock, charging station, external display, etc.), the display 560 (note that is some embodiments, electronic device 500C may not include display 560), and short to medium range wireless communication circuitry 529 (e.g., Bluetooth™ and WLAN circuitry). The short to medium range wireless communication circuitry 529 may also couple to one or more antennas, such as antennas 537 and 538 as shown. The short to medium range wireless communication circuitry 529 may include multiple receive chains and/or multiple transmit chains for receiving and/or transmitting multiple spatial streams, such as in a multiple-input multiple output (MIMO) configuration.

As shown, the SOC 506 may include processor(s) 502, which may execute program instructions for the electronic device 500C and display circuitry 504, which may perform graphics processing and provide display signals to the display 560 (and/or to dock 520). The processor(s) 502 may also be coupled to memory management unit (MMU) 540, which may be configured to receive addresses from the processor(s) 502 and translate those addresses to locations in memory (e.g., memory 506, read only memory (ROM) 550, NAND flash memory 510) and/or to other circuits or devices, such as the display circuitry 504, short range wireless communication circuitry 529, connector interface (I/F) 520, and/or display 560. The MMU 540 may be configured to perform memory protection and page table translation or set up. In some embodiments, the MMU 540 may be included as a portion of the processor(s) 502.

In some embodiments, electronic device 500C (and/or an electronic device such as electronic device 500A or 500B) may be in communication with a user input device, such as user input device 130 described above. In some embodiments, the electronic device may receive user input via user input device 130 as described above.

In addition, in some embodiments, electronic device 500C may include one or more positional sensors such as accelerometers, gyroscopic sensors, geomagnetic sensors, magnetic sensors, proximity sensors, gesture sensors, grip sensors, and/or biometric sensors. In some embodiments, the electronic device may acquire information for determining a motion of a user wearing the electronic device and/or whether a user wears or removes electronic device 500C, using the one or more positional sensors. The at least one processor may control execution of a function(s) or an operation(s) corresponding to an input received through a control device (for example, control device 514 and/or user input device 130) in response to a received input.

As described herein, the electronic device 500C may include hardware and software components for implementing the features described herein, e.g., the electronic device 500C may form at least part of a 3D display system such as system 100 described above and/or systems 500A and 5B described below. For example, the processor 502 of the electronic device 500C may be configured to implement part or all of the features described herein, e.g., by executing program instructions stored on a memory medium (e.g., a non-transitory computer-readable memory medium). Alternatively (or in addition), processor 502 may be configured as a programmable hardware element, such as an FPGA (Field Programmable Gate Array), or as an ASIC (Application Specific Integrated Circuit). Alternatively (or in addition) the processor 502 of the UE 106, in conjunction with one or more of the other components 500, 504, 506, 510, 520, 535, 550, 560 may be configured to implement part or all of the features described herein.

In some embodiments, electronic device 500C may include or be in communication with one or more external cameras. For example, electronic device 500C may include (or be in communication with) one or more cameras (or an array of cameras) that may be configured to capture images of a physical location of a user.

In addition, as described herein, processor 502 may include one or more processing elements. Thus, processor 502 may include one or more integrated circuits (ICs) that are configured to perform the functions of processor 502. In addition, each integrated circuit may include circuitry (e.g., first circuitry, second circuitry, etc.) configured to perform the functions of processor(s) 502.

Figure 6:
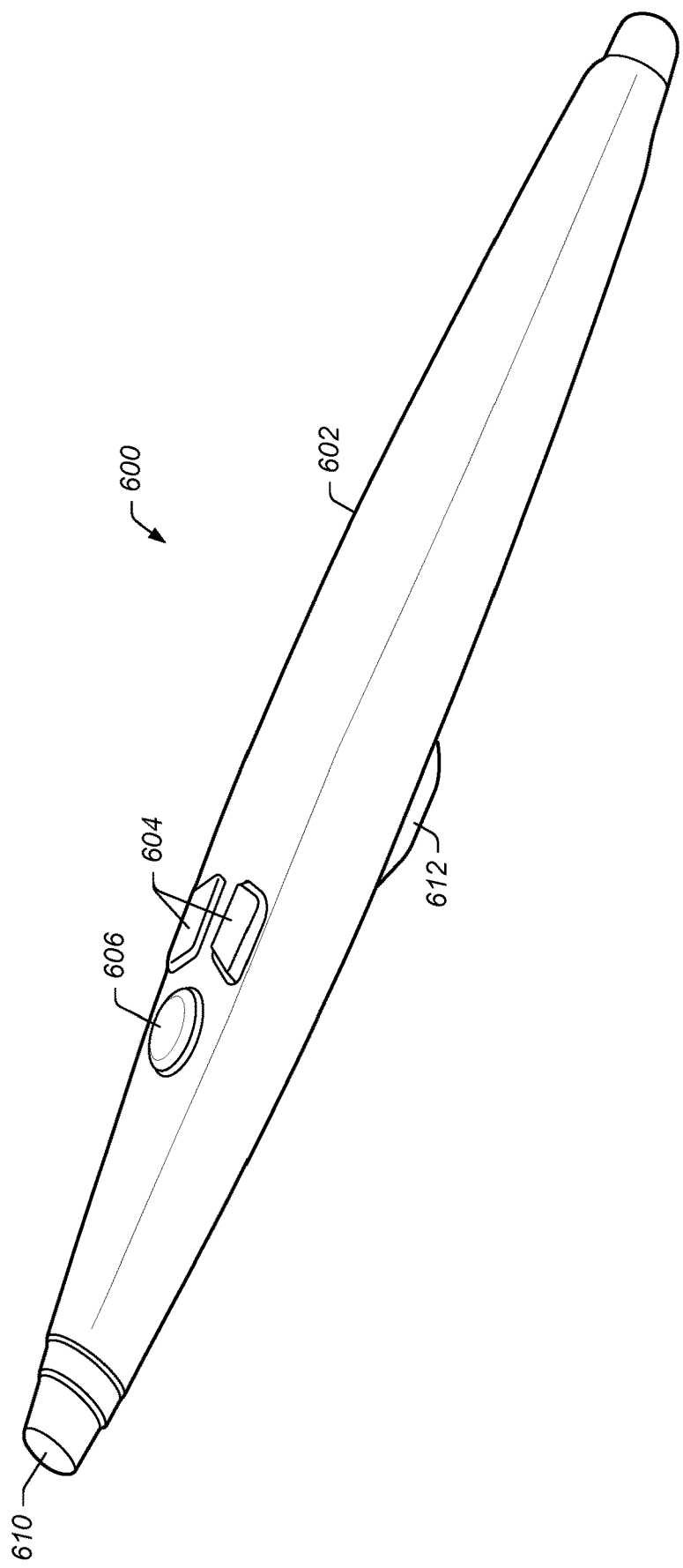
FIG. 6 illustrates an example of a user input device, according to some embodiments.

FIG. 6 illustrates an example of a user input device, according to some embodiments. As shown, a user input device 600 may be configured to perform various embodiments as described herein. User input device 600 may be similar to or the same as user input device 130 as described above in reference to FIGS. 4 and 5B-5C. Thus, user input device 600 may be used in conjunction with, or be included in, systems 100A-B and/or systems 500A-B. As described above, systems 100A-B and/or systems 500A-B may have the capability to determine the six-axis position and orientation of user input device 600. Note that this includes the X, Y, Z location of tip 610 of user input device 600 and the α, β, γ angular orientation of body 602 of user input device 600. However, it should be further noted that user input device 600 is exemplary, and that other user input devices, suitably configured, may be used as desired.

As shown, user input device 600 may include buttons 604, 606, and 612. In some embodiments, the buttons 604, 606, and/or 612 may be faux (or dummy) buttons. In other words, buttons 604, 606, and/or 612 may be non-functioning buttons, e.g., a system, such as systems 100A-B and/or 500A-B described herein, may detect a user action of pressing a location of user input device 600 identified by the system as a button location. Hence, in some embodiments, buttons 604, 606, and/or 612 may be identifiable locations (e.g., via a visible marker, a raised area, and/or a dimpled or depressed area). In some embodiments, one of the buttons, such as button 606, may be "depressed" and "held down" to trigger the selection of an object within a 3D scene presented by any of systems 100A-B and/or 500A-B. Additionally, system 100 may be configured to display a virtual "laser like" projection from tip 610 to the selected object. With the object selected, adjustment of the position and/or orientation of user input device 600 may change the position and/or orientation of the object. Thus, movements of the user input device 600 may result in corresponding translations and/or rotations of the object.

Passive Stylus Capabilities Improvements

In some existing implementations, computer systems that have a three dimensional (3D) display typically include a stylus to enable a user to interact with displayed virtual 3D imagery. The implementation of a properly functioning stylus may require the computer system to include capabilities to determine position and/or orientation of the stylus with a sufficient degree of accuracy. Position may be described by X, Y and Z spatial coordinates while orientation may be described by roll, pitch and yaw angles. Collectively these 6 values are referred to as the 6 Degrees of Freedom (DoF) of the stylus. There are many examples of means used to enable the provide 6 DoF inputs to the system. For example, in some implementations, light emitters (such as light emitting diodes (LEDs) may be placed at various locations (e.g., at ends of the stylus and along the stylus) on the stylus and multiple cameras in communication with the system (and often placed on the system) may be used to detect and triangulate the spatial positions of the light sources. As another example, retroreflector dots may be placed at various locations (e.g., at ends of the stylus and along the stylus) of the stylus. In such implementations, a work space may be illuminated with infrared light and cameras in communication with the system (and often placed on the system) may be used to identify and triangulate the spatial positions of the sources of the retroreflections.

In practice, these various means of tracking location/orientation of the stylus require integration of additional capabilities into the stylus to achieve the sufficient degree of accuracy and precision required for useful 6 DoF position and orientation detection. The types of additional capabilities that have been found useful and that can be integrated into the stylus include one or more of accelerometers, magnetometers, gyroscopes, global positioning systems (GPS), compass and gravity sensors, and/or cameras or other optical, inductive, capacitive, photoelectric, or ultrasonic sensors. Since implementation of these capabilities require that electronic components be integrated into the stylus, this type of stylus is often referred to as an "active" stylus. Integration of the extra components add considerable cost and complexity to the active stylus.

An additional issue that relates to the active stylus is the desire for one or more buttons to provide means for user input to the computer system. The integration of such buttons typically requires the inclusion of an electro-mechanical feature which adds additional cost and complexity to the active stylus. In addition, active components can also increase system failure rates.

Furthermore, in the case of an active stylus, power is required for the electronic components described above. This, in turn, means that either batteries are included in the active stylus or that the active stylus be tethered to a power source (such as the computer console). Once again, the need for power adds further cost and complexity to the active stylus.

One approach to the creation of a stylus that is simpler and less expensive than an active stylus is the use of a so-called "passive" stylus. A passive stylus may be defined as an input device that does not require power or contain any electronic components. For example, a passive stylus may be a pencil-like plastic rod upon which are located several strategically positioned retroreflector dots. In such implementations, the work space may be flooded with infrared light and multiple cameras in communication with the system (and often placed on the system) may identify and triangulate the 6 DoF position and orientation of the passive stylus. In addition, the passive stylus can have "dummy" locations marked as buttons for user input. Another possibility is markers. These markers might be molded into the stylus body and painted or coated with retroreflective or metallic paint. Although this approach does indeed meet the simplicity requirements for a passive stylus, in practice, such an approach does not provide a capability for the sufficient degree of accuracy and precision of 6 DoF position and orientation tracking. More specifically, such an approach does not enable the ability to adequately track the roll orientation of the passive stylus.

In addition, in practice, current means of detection cannot reliably determine when a user presses a "dummy" button on a passive stylus. The means used for detection can include the momentary occlusion of a retroreflective dot or the momentary dip in the tip of the passive stylus as the dummy button is pressed.

An alternative approach to an active stylus/passive stylus is hand gesture recognition. Commercially available hand gesture detection and recognition systems can typically detect motions such as pinch, swipe, pointing and the opening and closing of the user's hand. However, as a practical matter, current commercially available hand gesture recognition systems are not capable of determining the orientation and position of a hand held passive stylus. Neither can such a hand gesture recognition system detect when a user presses a dummy button on a passive stylus.

Embodiments described herein provide techniques, methods, and mechanisms to enhance trackability of a passive stylus in a 3D display system. In some embodiments, enhancement may be achieved by adding hand gesture recognition capability to the tracking system of the 3D display system. In some embodiments, techniques include enhanced detection of roll of a passive stylus. In some embodiments, techniques include enhanced detection of a "button press" of a faux button on a passive stylus.

For example, in some embodiments, a retroreflector system may be combined with a hand gesture recognition system to track 6 DoF of a passive stylus. In some embodiments, the retroreflector system may provide means for identification of 5 DoF (e.g., X, Y, Z location as well as pitch and yaw angles) of a passive stylus and the hand gesture recognition system may track characteristic motions associated with rolling (e.g., roll angle) of the passive stylus. In some embodiments, constraints that are present from the human hand/wrist may be considered, e.g., movement about some axes are more fluid and natural for a human hand/wrist. In other words, there may be a set of motions of the human hand/wrist that are more probable and/or expected which may aid in both tracking of the human hand/wrist (and/or stylus) and recognition of movements, gestures, buttons, and overall usage.

Figure 7:
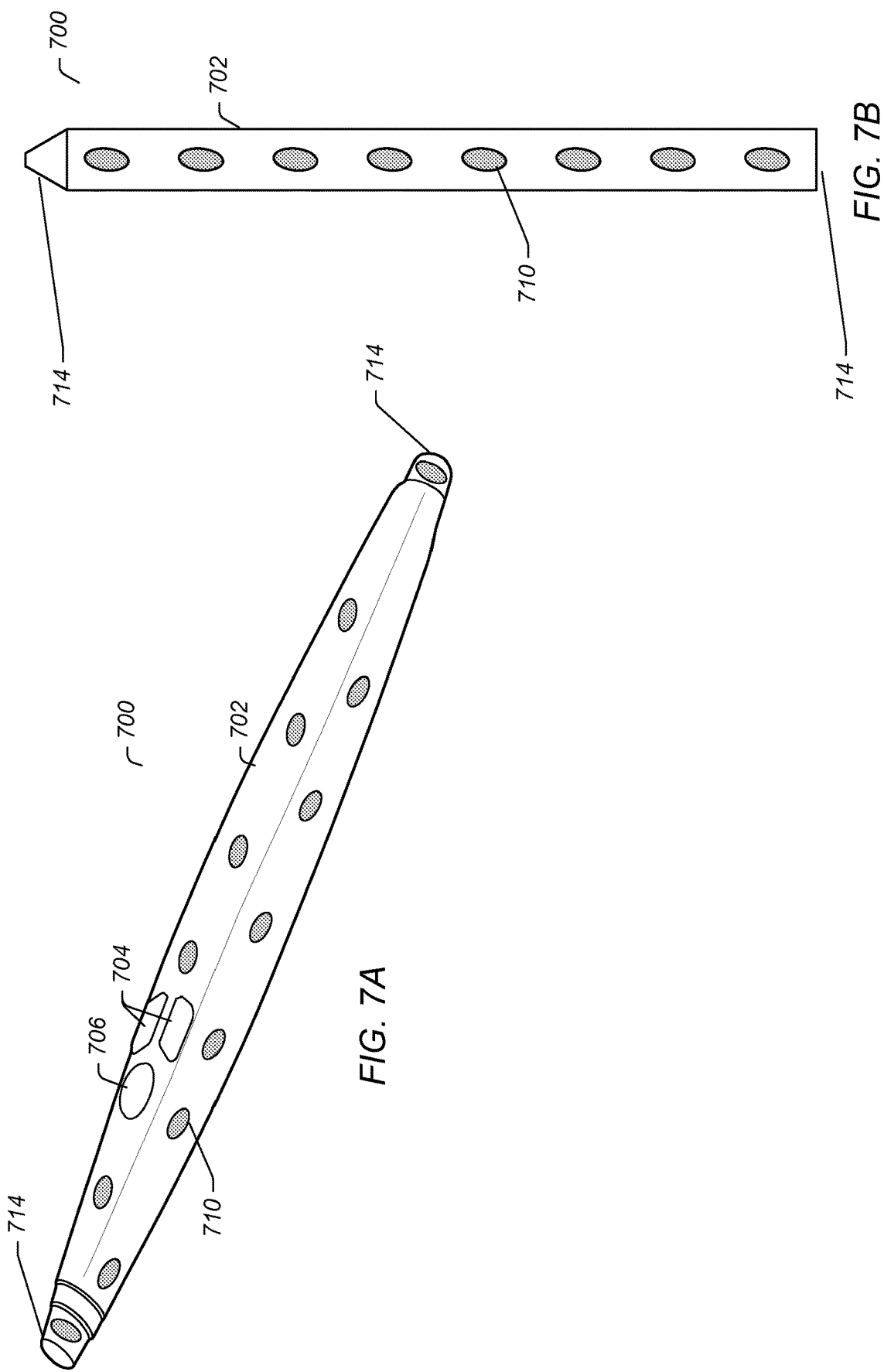
FIGS. 7A-B illustrate an example of a passive stylus with a retroreflector system, according to some embodiments.

FIGS. 7A-B illustrate an example of a passive stylus with a retroreflector system, according to some embodiments. As shown, a passive stylus 700 may be configured to perform various embodiments as described herein. Passive stylus 700 may be similar to or the same as user input device 600 as described above in reference to FIG. 6. Thus, passive stylus 700 may be used in conjunction with, or be included in, systems 100A-B and/or systems 500A-B. As described above, systems 100A-B and/or systems 500A-B may have the capability to determine the six-axis position and orientation of passive stylus 700. Note that this includes the X, Y, Z location of ends 714 of the passive stylus 700 and the pitch, yaw, and roll angular orientation of body 702. However, it should be further noted that user input device 700 is exemplary, and that other user input devices, suitably configured, may be used as desired.

As shown, passive stylus 700 may include faux (or dummy) buttons 704 and 706. In some embodiments, the faux buttons 704 and 706 may be non-functioning buttons, e.g., a system, such as systems 100A-B and/or systems 500A-B described herein, may detect a user action of pressing a location of passive stylus 700 identified by the system as a button location (e.g., faux buttons 704 and/or 706). Hence, in some embodiments, buttons 704 and 706 may be identifiable locations (e.g., via a visible marker, a raised area, and/or a dimpled or depressed area). In some embodiments, one of the buttons, such as button 706, may be "depressed" and/or "held down" to trigger the selection of an object (e.g., a virtual object) within a 3D scene presented by any of systems 100A-B and/or systems 500A-B. Additionally, systems 100A-B and/or 500-B may be configured to display a virtual "laser like" projection from one of the ends 714 of passive stylus 700 to the selected object. With the object selected, adjustment of the position and/or orientation of passive stylus 700 may change the position and/or orientation of the object. Thus, movements of the passive stylus 700 may result in corresponding translations and/or rotations of the object.

In some embodiments, the faux buttons 704 and 706 may be and/or include mechanical buttons (or mechanical domes) that may emit a clicking sound (or noise) when depressed and/or released. In some embodiments, the audible clicking noise may be detected by a microphone of the system, e.g., a microphone of systems 100A-B and/or 500A-B. In some embodiments, detection of the audible clicking noise may result in the system interpreting the audible clicking noise as a user input (e.g., a button depress/button release). In some embodiments, the system may respond to the audible clicking noise by performing one or more actions (e.g., selection of a virtual object, display of a menu, projection of a virtual laser beam, display of a virtual stylus, and so forth). For example, a system, such as systems 100A-B and/or systems 500A-B described herein, may detect a user action of pressing a button based, at least in part, on detection of the sound emitted from the mechanical button (or dome). In some embodiments, one of the buttons, such as button 706, may be "depressed" and/or "held down" to trigger the selection of an object within a 3D scene presented by any of systems 100A-B and/or systems 500A-B. Additionally, systems 100A-B and/or 500-B may be configured to display a virtual "laser like" projection from one of the ends 714 of passive stylus 700 to the selected object. With the object selected, adjustment of the position and/or orientation of passive stylus 700 may change the position and/or orientation of the object. Thus, movements of the passive stylus 700 may result in corresponding translations and/or rotations of the object. Note that in some embodiments, a combination of sound emittance and location tracking may be used to determine button activation/deactivation.

In some embodiments, the faux buttons 704 and 706 may be and/or include mechanical buttons (or mechanical domes) that may change reflective properties upon depression and release. For example, a portion of the faux button may be mechanically released upon depression resulting in appearance of an additional retroreflector and/or causing a visible retroreflector to be obscured. In such embodiments, the system may detect the change in reflective properties as an indication of a button trigger and respond to the change in reflective properties by performing one or more actions (e.g., selection of a virtual object, display of a menu, projection of a virtual laser beam, display of a virtual stylus, and so forth).

In some embodiments, selection of an object (e.g., a virtual object within a 3D scene), e.g., via a faux button, such as faux buttons 704 and/or 706, may be maintained until "release" of the faux button (e.g., a user removes a finger from the button location). In some embodiments, selection of an object (e.g., a virtual object within a 3D scene), e.g., via a faux button, such as faux buttons 704 and/or 706, may be maintained until a second "press" (e.g., detection of a second user interaction with the faux button) of the faux button.

In some embodiments, a system, such as systems 100A-B and/or systems 500A-B described herein, may track position and/or orientation of the passive stylus 700 via tracking of retroreflectors 710 of passive stylus 700. As shown, retroreflectors 710 may be distributed along the body 702 of passive stylus 700. In some embodiments, each retroreflector of retroreflectors 710 may have (or be) a distinct shape, e.g., to allow the system to better distinguish location of a retroreflector along the body 702 of passive stylus 700. In some embodiments, groups (or portions) of retroreflectors 710 may have (or be) a distinct shape, e.g., to allow the system to better distinguish location of a group (or portion) of retroreflectors along the body 702 of passive stylus 700. For example, a first retroreflector (or group of retroreflectors) may have a first shape that can be distinguished from a second retroreflector (or group of retroreflectors) having a second shape. Thus, in some embodiments, the system may distinguish a first location along the body 702 from a second location along the body 702, e.g., based, at least in part, on the first shape of the first retroreflector (or group of retroreflectors) at the first location being distinguishable (different) than the second shape of the second retroreflector (or group of retroreflectors).

In some embodiments, the system may track location of each retroreflector of the retroreflectors 710 to track (e.g., as described above) position (e.g., X, Y, and Z) and/or orientation (e.g., pitch, yaw, roll) of passive stylus 700 in a physical space. In some embodiments, the position and/or orientation may be relative to a display of the system. In some embodiments, tracking the position and/or orientation of passive stylus 700 may include determining a position (X, Y, and Z) in physical space of each retroreflector of the retroreflectors 710 relative to the other retroreflectors. In such a manner, orientation (pitch, yaw, roll) of the passive stylus 700 may be determine. In some embodiments, the locations of the retroreflectors 710 may be combined with a hand gesture recognition system to improve (augment) tracking 6 DoF of the passive stylus 700. In some embodiments, the retroreflectors 710 may provide means (e.g., as described above) for identification of 5 DoF (e.g., X, Y, Z location as well as pitch and yaw angles) of the passive stylus 700 and the hand gesture recognition system may track characteristic motions associated with rolling (e.g., roll angle) of the passive stylus 700.

In some embodiments, the system may detect a user interaction with an object (e.g., a virtual object within the 3D scene) based on tracking of an "in and out" motion of the virtual stylus 700 relative to the object. In some embodiments, the "in and out" motion (e.g., moving towards and then away from the object as if to depress and release the object) may indicate selection of the object and/or may indicate pressing of a virtual button (e.g., an object in the 3D scene may represent a virtual button).). In some embodiments, the system may respond to "in and out" motion" relative to the object by performing one or more actions (e.g., selection of a virtual object, display of a menu, projection of a virtual laser beam, display of a virtual stylus, and so forth). In some embodiments, the object may be a rendering of a button.

In some embodiments, passive stylus 700 may control a virtual user input device rendered within the 3D scene. In such embodiments, tracked movement of the passive stylus 700 may be mapped to virtual movements of the virtual user input device. In some embodiments, the virtual user input device may be rendered as a virtual stylus, a virtual finger, and/or some other type of virtual pointing device. In such embodiments, the passive stylus 700 may be manipulated to control the virtual user input device to select various objects within the 3D scene, such as a virtual 3D object, a virtual menu, a virtual button, and so forth.

In some embodiments, tracking location of passive stylus 700 along with hand movement recognition may aid in determining a user's intent when interacting with a 3D scene. For example, if a user were to rotate a passive stylus, such as passive stylus 700, 180 degrees, as if to switch ends of the passive stylus pointing in the direction of the 3D scene, hand movement recognition may be used to determine whether the user intends to use the passive stylus as an eraser (e.g., after rotation, holds the stylus in a manner resembling a person intent on erasing markings on a paper) or is intending to use the passive stylus backwards. As further examples, user intention may be inferred based on passive stylus position and orientation with respect to the system and recognition of the user's hand movement to distinguish whether the user intends to use the passive stylus as pointer, a pen, a knitting needle, a drum stick, a hammer, and so forth.

In some embodiments, hand position and movements coupled with passive stylus 700 tracking information may offer a more insightful view into what a user intends to accomplish. For example, circular motions of a passive stylus when being held like a fork may be differentiated from circular motions of the passive stylus when being held like a paintbrush.

In some embodiments, passive stylus 700 may include a bar code and/or a quick response (QR) code. In some embodiments, the bar/QR code may be recognized (e.g., captured via a camera) by the system (e.g., systems 100A-B and/or 500A-B) and linked to a user. Thus, once identified by the bar/QR code, passive stylus/user specific information resident (or stored) in the system and/or in a server in communication with the system (e.g., a local cloud connected via an intranet and/or a remote cloud connected via the Internet) may be used to apply passive stylus/user specific preferences to the system and/or software, thereby enhancing user experience.

Figure 8:
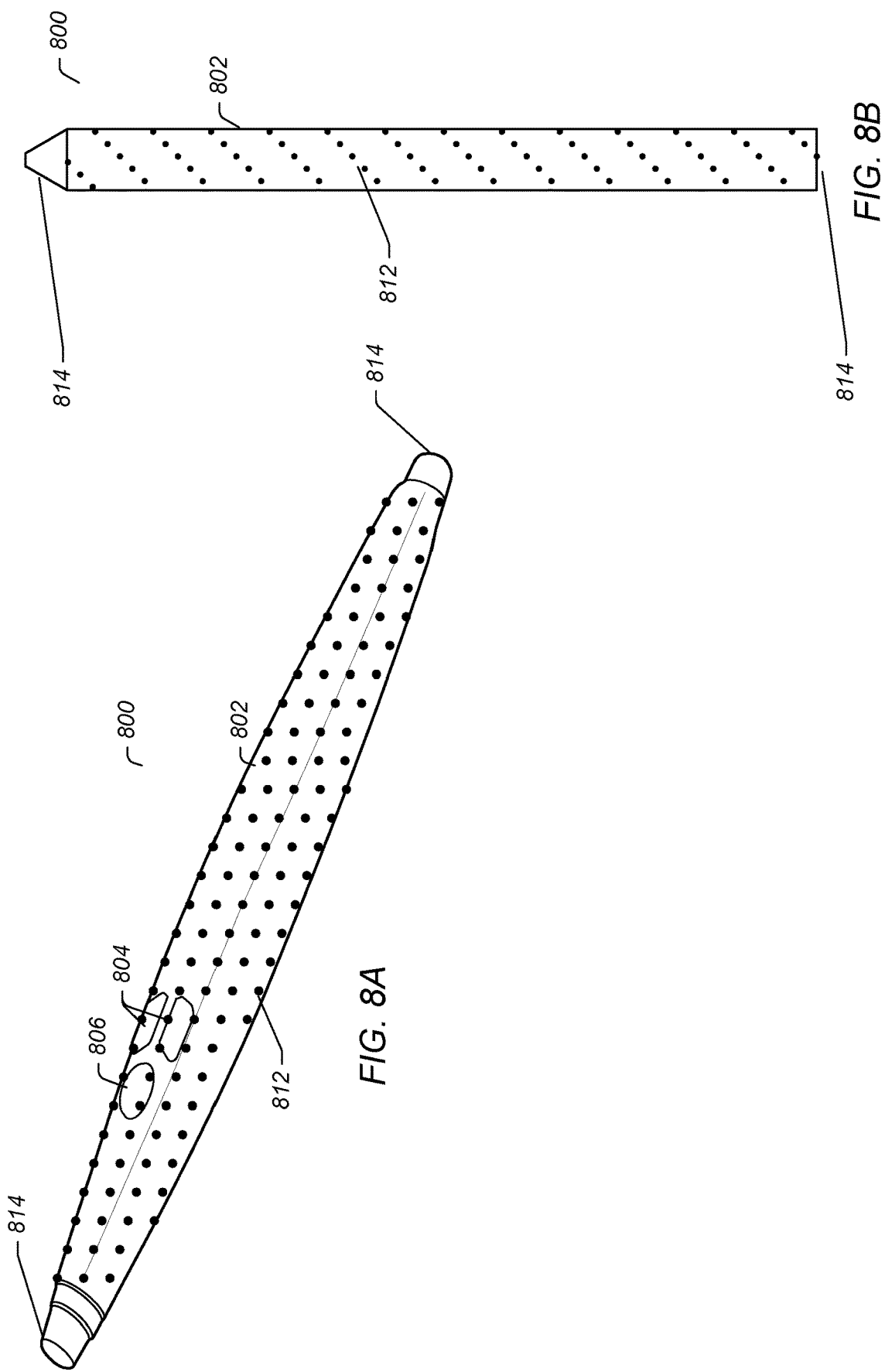
FIGS. 8A-B illustrate an example of a passive stylus with a spiral pattern of retroreflector spots, according to some embodiments.

In some embodiments, a "spiral pattern" of retroreflector spots along a length of a shaft of a passive stylus may further enhance detection of roll angle. For example, FIGS. 8A-B illustrate an example of a passive stylus with a spiral pattern of retroreflector spots, according to some embodiments. In some embodiments, a "spiral pattern" of retroreflector spots may be combined with a hand gesture recognition system to track 6 DoF of a passive stylus. In some embodiments, the "spiral pattern" of retroreflector spots may provide means for identification of 6 DoF (e.g., X, Y, Z location as well as pitch, yaw, and roll angles) of a passive stylus and the hand gesture recognition system may track characteristic motions associated with rolling (e.g., roll angle) of the passive stylus, e.g., to improve tracking of roll angle. For example, FIGS. 8A-B illustrate an example of a passive stylus with a spiral patter of retroreflector spots, according to some embodiments. As shown, a passive stylus 800 may be configured to perform various embodiments as described herein. Passive stylus 800 may be similar to or the same as user input device 600 as described above in reference to FIG. 6. Thus, passive stylus 800 may be used in conjunction with, or be included in, system 100A-B and/or systems 500A-B. As described above, systems 100A-B and/or systems 500A-B may have the capability to determine the six-axis position and orientation of passive stylus 800. Note that this includes the X, Y, Z location of ends 814 of the passive stylus 800 and the pitch, yaw, and roll angular orientation of body 802. However, it should be further noted that user input device 800 is exemplary, and that other user input devices, suitably configured, may be used as desired.

As shown, passive stylus 800 may include faux (or dummy) buttons 804 and 806. The faux buttons 804 and 806 may be non-functioning buttons, e.g., a system, such as systems 100A-B and/or systems 500A-B described herein, may detect a user action of pressing a location of passive stylus 800 identified by the system as a button location (e.g., faux buttons 804 and/or 806). Hence, in some embodiments, buttons 804 and 806 may be identifiable locations (e.g., via a visible marker, a raised area, and/or a dimpled or depressed area). In some embodiments, one of the buttons, such as button 806, may be "depressed" and "held down" to trigger the selection of an object within a 3D scene presented by any of systems 100A-B and/or systems 500A-B. Additionally, systems 100A-B and/or systems 500A-B may be configured to display a virtual "laser like" projection from one of the ends 814 of passive stylus 800 to the selected object. With the object selected, adjustment of the position and/or orientation of passive stylus 800 may change the position and/or orientation of the object. Thus, movements of the passive stylus 800 may result in corresponding translations and/or rotations of the object.

In some embodiments, the faux buttons 804 and 806 may be and/or include mechanical buttons (or mechanical domes) that may emit a clicking sound (or noise) when depressed and/or released. In some embodiments, the audible clicking noise may be detected by a microphone of the system, e.g., a microphone of systems 100A-B and/or 500A-B. In some embodiments, detection of the audible clicking noise may result in the system interpreting the audible clicking noise as a user input (e.g., a button depress/button release). In some embodiments, the system may respond to the audible clicking noise by performing one or more actions (e.g., selection of a virtual object, display of a menu, projection of a virtual laser beam, display of a virtual stylus, and so forth). For example, a system, such as systems 100A-B and/or systems 500A-B described herein, may detect a user action of pressing a button based, at least in part, on detection of the sound emitted from the mechanical button (or dome). In some embodiments, one of the buttons, such as button 806, may be "depressed" and/or "held down" to trigger the selection of an object within a 3D scene presented by any of systems 100A-B and/or systems 500A-B. Additionally, systems 100A-B and/or 500-B may be configured to display a virtual "laser like" projection from one of the ends 814 of passive stylus 800 to the selected object. With the object selected, adjustment of the position and/or orientation of passive stylus 800 may change the position and/or orientation of the object. Thus, movements of the passive stylus 800 may result in corresponding translations and/or rotations of the object. Note that in some embodiments, a combination of sound emittance and location tracking may be used to determine button activation/deactivation.

In some embodiments, the faux buttons 804 and 806 may be and/or include mechanical buttons (or mechanical domes) that may change reflective properties upon depression and release. For example, a portion of the faux button may be mechanically released upon depression resulting in appearance of an additional retroreflector and/or causing a visible retroreflector to be obscured. In such embodiments, the system may detect the change in reflective properties as an indication of a button trigger and respond to the change in reflective properties by performing one or more actions (e.g., selection of a virtual object, display of a menu, projection of a virtual laser beam, display of a virtual stylus, and so forth).

In some embodiments, selection of an object (e.g., a virtual object within a 3D scene), e.g., via a faux button, such as faux buttons 804 and/or 806, may be maintained until "release" of the faux button (e.g., a user removes a finger from the button location). In some embodiments, selection of an object (e.g., a virtual object within a 3D scene), e.g., via a faux button, such as faux buttons 804 and/or 806, may be maintained until a second "press" (e.g., detection of a second user interaction with the faux button) of the faux button.

In some embodiments, a system, such as systems 100A-B and/or systems 500A-B described herein, may track position and/or orientation of the passive stylus 800 via tracking of a spiral retroreflector pattern 812 of passive stylus 800. As shown, spiral retroreflector pattern 812 may be distributed along the body 802 of passive stylus 800. Thus, the system may track location of each retroreflector of the spiral retroreflector pattern 812 to track (e.g., as described above) position (e.g., X, Y, and Z) and/or orientation (e.g., pitch, yaw, roll) of passive stylus 800 in a physical space. In some embodiments, the position and/or orientation may be relative to a display of the system. In some embodiments, tracking the position and/or orientation of passive stylus 800 may include determining a position (X, Y, and Z) in physical space of each retroreflector of the spiral retroreflector pattern 812 relative to the other retroreflectors. In such a manner, orientation (pitch, yaw, roll) of the passive stylus 800 may be determine. In some embodiments, the locations of the spiral retroreflector pattern 812 may be combined with a hand gesture recognition system to improve (augment) tracking 6 DoF of the passive stylus 800. In some embodiments, the spiral retroreflector pattern 812 may provide means (e.g., as described above) for identification of 6 DoF (e.g., X, Y, Z location as well as pitch, yaw, and roll angles) of the passive stylus 800 and the hand gesture recognition system may track characteristic motions associated with rolling (e.g., roll angle) of the passive stylus 800, e.g., to enhance and/or augment tracking of roll angle of body 802.

In some embodiments, the system may detect a user interaction with an object (e.g., a virtual object within the 3D scene) based on tracking of an "in and out" motion of the virtual stylus 800 relative to the object. In some embodiments, the "in and out" motion (e.g., moving towards and then away from the object as if to depress and release the object) may indicate selection of the object and/or may indicate pressing of a virtual button (e.g., an object in the 3D scene may represent a virtual button).). In some embodiments, the system may respond to "in and out" motion" relative to the object by performing one or more actions (e.g., selection of a virtual object, display of a menu, projection of a virtual laser beam, display of a virtual stylus, and so forth). In some embodiments, the object may be a rendering of a button.

In some embodiments, passive stylus 800 may control a virtual user input device rendered within the 3D scene. In such embodiments, tracked movement of the passive stylus 800 may be mapped to virtual movements of the virtual user input device. In some embodiments, the virtual user input device may be rendered as a virtual stylus, a virtual finger, and/or some other type of virtual pointing device. In such embodiments, the passive stylus 800 may be manipulated to control the virtual user input device to select various objects within the 3D scene, such as a virtual 3D object, a virtual menu, a virtual button, and so forth.

In some embodiments, tracking location of passive stylus 800 along with hand movement recognition may aid in determining a user's intent when interacting with a 3D scene. For example, if a user were to rotate a passive stylus, such as passive stylus 800, 180 degrees, as if to switch ends of the passive stylus pointing in the direction of the 3D scene, hand movement recognition may be used to determine whether the user intends to use the passive stylus as an eraser (e.g., after rotation, holds the stylus in a manner resembling a person intent on erasing markings on a paper) or is intending to use the passive stylus backwards. As further examples, user intention may be inferred based on passive stylus position and orientation with respect to the system and recognition of the user's hand movement to distinguish whether the user intends to use the passive stylus as pointer, a pen, a knitting needle, a drum stick, a hammer, and so forth.

In some embodiments, hand position and movements coupled with passive stylus 800 tracking information may offer a more insightful view into what a user intends to accomplish. For example, circular motions of a passive stylus when being held like a fork may be differentiated from circular motions of the passive stylus when being held like a paintbrush.

In some embodiments, passive stylus 800 may include a bar code and/or a quick response (QR) code. In some embodiments, the bar/QR code may be recognized (e.g., captured via a camera) by the system (e.g., systems 100A-B and/or 500A-B) and linked to a user. Thus, once identified by the bar/QR code, passive stylus/user specific information resident (or stored) in the system and/or in a server in communication with the system (e.g., a local cloud connected via an intranet and/or a remote cloud connected via the Internet) may be used to apply passive stylus/user specific preferences to the system and/or software, thereby enhancing user experience.

Figure 9:
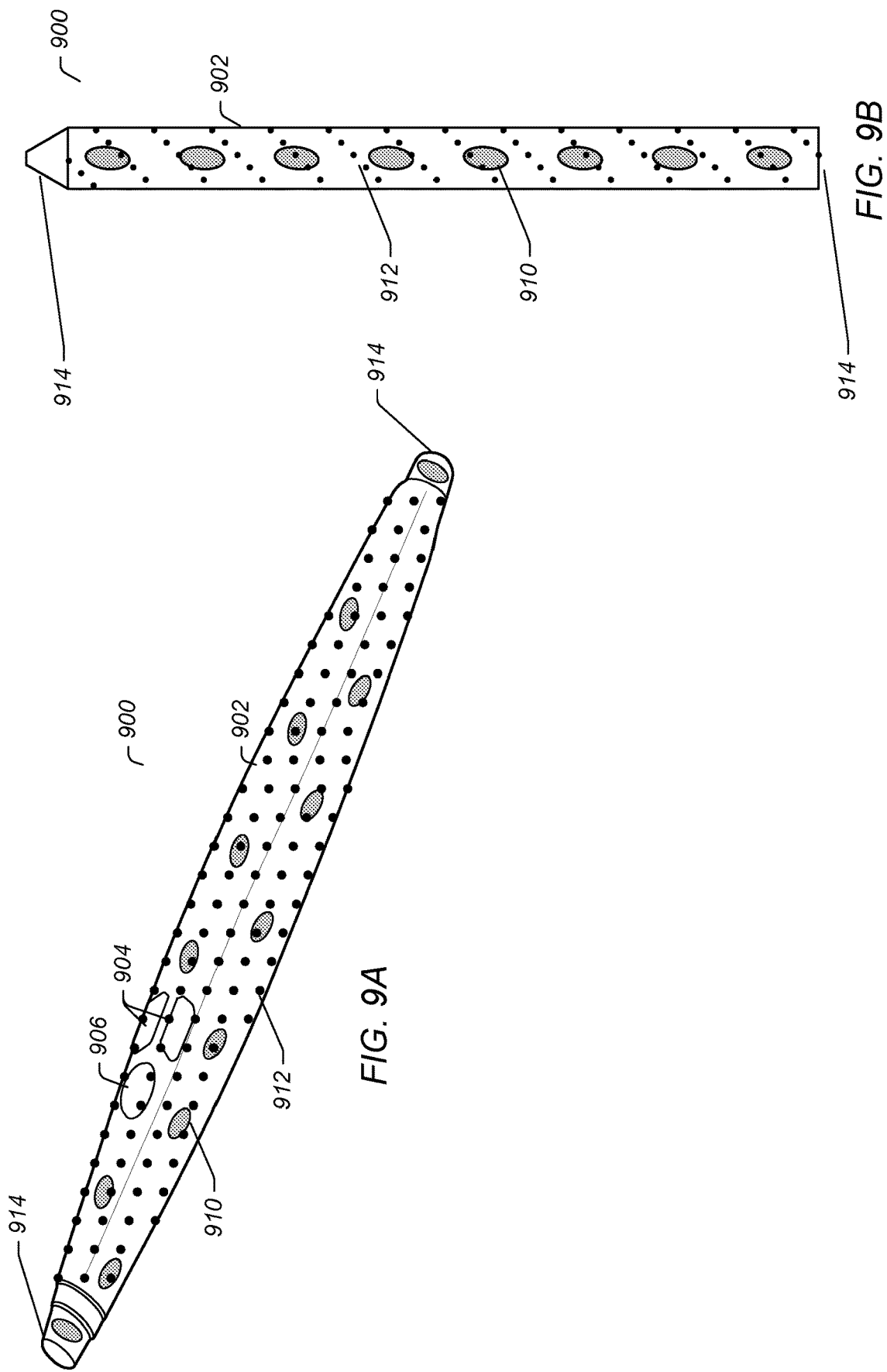
FIGS. 9A-B B illustrate an example of a passive stylus with a retroreflector system and a spiral pattern of retroreflector spots, according to some embodiments.

As a further example, FIGS. 9A-B B illustrate an example of a passive stylus with a retroreflector system and a spiral pattern of retroreflector spots, according to some embodiments. As shown, a passive stylus 900 may be configured to perform various embodiments as described herein. Passive stylus 900 may be similar to or the same as user input device 600 as described above in reference to FIG. 6. Thus, passive stylus 900 may be used in conjunction with, or be included in, system 100A-B and/or systems 500A-B. As described above, systems 100A-B and/or systems 500A-B may have the capability to determine the six-axis position and orientation of passive stylus 900. Note that this includes the X, Y, Z location of ends 914 of the passive stylus 900 and the pitch, yaw, and roll angular orientation of body 902. However, it should be further noted that user input device 900 is exemplary, and that other user input devices, suitably configured, may be used as desired.

As shown, passive stylus 900 may include faux (or dummy) buttons 904 and 906. The faux buttons 904 and 906 may be non-functioning buttons, e.g., a system, such as systems 100A-B and/or systems 500A-B described herein, may detect a user action of pressing a location of passive stylus 900 identified by the system as a button location (e.g., faux buttons 904 and/or 906). Hence, in some embodiments, buttons 904 and 906 may be identifiable locations (e.g., via a visible marker, a raised area, and/or a dimpled or depressed area). In some embodiments, one of the buttons, such as button 906, may be "depressed" and "held down" to trigger the selection of an object within a 3D scene presented by any of systems 100A-B and/or systems 500A-B. Additionally, systems 100A-B and/or 500A-B may be configured to display a virtual "laser like" projection from one of the ends 914 of passive stylus 900 to the selected object. With the object selected, adjustment of the position and/or orientation of passive stylus 900 may change the position and/or orientation of the object. Thus, movements of the passive stylus 900 may result in corresponding translations and/or rotations of the object.

In some embodiments, the faux buttons 904 and 906 may be and/or include mechanical buttons (or mechanical domes) that may emit a clicking sound (or noise) when depressed and/or released. In some embodiments, the audible clicking noise may be detected by a microphone of the system, e.g., a microphone of systems 100A-B and/or 500A-B. In some embodiments, detection of the audible clicking noise may result in the system interpreting the audible clicking noise as a user input (e.g., a button depress/button release). In some embodiments, the system may respond to the audible clicking noise by performing one or more actions (e.g., selection of a virtual object, display of a menu, projection of a virtual laser beam, display of a virtual stylus, and so forth). For example, a system, such as systems 100A-B and/or systems 500A-B described herein, may detect a user action of pressing a button based, at least in part, on detection of the sound emitted from the mechanical button (or dome). In some embodiments, one of the buttons, such as button 906, may be "depressed" and/or "held down" to trigger the selection of an object within a 3D scene presented by any of systems 100A-B and/or systems 500A-B. Additionally, systems 100A-B and/or 500-B may be configured to display a virtual "laser like" projection from one of the ends 914 of passive stylus 900 to the selected object. With the object selected, adjustment of the position and/or orientation of passive stylus 900 may change the position and/or orientation of the object. Thus, movements of the passive stylus 900 may result in corresponding translations and/or rotations of the object. Note that in some embodiments, a combination of sound emittance and location tracking may be used to determine button activation/deactivation.

In some embodiments, the faux buttons 904 and 906 may be and/or include mechanical buttons (or mechanical domes) that may change reflective properties upon depression and release. For example, a portion of the faux button may be mechanically released upon depression resulting in appearance of an additional retroreflector and/or causing a visible retroreflector to be obscured. In such embodiments, the system may detect the change in reflective properties as an indication of a button trigger and respond to the change in reflective properties by performing one or more actions (e.g., selection of a virtual object, display of a menu, projection of a virtual laser beam, display of a virtual stylus, and so forth).

In some embodiments, selection of an object (e.g., a virtual object within a 3D scene), e.g., via a faux button, such as faux buttons 904 and/or 906, may be maintained until "release" of the faux button (e.g., a user removes a finger from the button location). In some embodiments, selection of an object (e.g., a virtual object within a 3D scene), e.g., via a faux button, such as faux buttons 904 and/or 906, may be maintained until a second "press" (e.g., detection of a second user interaction with the faux button) of the faux button.

In some embodiments, a system, such as systems 100A-B and/or systems 500A-B described herein, may track position and/or orientation of the passive stylus 900 via tracking of retroreflectors 910 and a spiral retroreflector pattern 912 of passive stylus 900. As shown, spiral retroreflector pattern 912 may be distributed along the body 902 of passive stylus 900. Similarly, retroreflectors 910 may be distributed along the body 902 of passive stylus 900.

In some embodiments, each retroreflector of retroreflectors 910 may have (or be) a distinct shape, e.g., to allow the system to better distinguish location of a retroreflector along the body 902 of passive stylus 900. In some embodiments, groups (or portions) of retroreflectors 910 may have (or be) a distinct shape, e.g., to allow the system to better distinguish location of a group (or portion) of retroreflectors along the body 902 of passive stylus 900. For example, a first retroreflector (or group of retroreflectors) may have a first shape that can be distinguished from a second retroreflector (or group of retroreflectors) having a second shape. Thus, in some embodiments, the system may distinguish a first location along the body 902 from a second location along the body 902, e.g., based, at least in part, on the first shape of the first retroreflector (or group of retroreflectors) at the first location being distinguishable (different) than the second shape of the second retroreflector (or group of retroreflectors).

In some embodiments, the system may track location of each retroreflector of the retroreflectors 910 and each retroreflector of the spiral retroreflector pattern 912 to track (e.g., as described above) position (e.g., X, Y, and Z) and/or orientation (e.g., pitch, yaw, roll) of passive stylus 900 in a physical space. In some embodiments, the position and/or orientation may be relative to a display of the system. In some embodiments, tracking the position and/or orientation of passive stylus 900 may include determining a position (X, Y, and Z) in physical space of each retroreflector of the retroreflectors 910 and each retroreflector of the spiral retroreflector pattern 912 relative to the other retroreflectors. In such a manner, orientation (pitch, yaw, roll) of the passive stylus 900 may be determine. In some embodiments, the locations of the retroreflectors 910 and spiral retroreflector pattern 912 may be combined with a hand gesture recognition system to improve (augment) tracking 6 DoF of the passive stylus 900. In some embodiments, the retroreflectors 910 and the spiral retroreflector pattern 912 may provide means (e.g., as described above) for identification of 6 DoF (e.g., X, Y, Z location as well as pitch, yaw, and roll angles) of the passive stylus 900 and the hand gesture recognition system may track characteristic motions associated with rolling (e.g., roll angle) of the passive stylus 900, e.g., to enhance and/or augment tracking of roll angle of body 902.

In some embodiments, the system may detect a user interaction with an object (e.g., a virtual object within the 3D scene) based on tracking of an "in and out" motion of the virtual stylus 900 relative to the object. In some embodiments, the "in and out" motion (e.g., moving towards and then away from the object as if to depress and release the object) may indicate selection of the object and/or may indicate pressing of a virtual button (e.g., an object in the 3D scene may represent a virtual button).). In some embodiments, the system may respond to "in and out" motion" relative to the object by performing one or more actions (e.g., selection of a virtual object, display of a menu, projection of a virtual laser beam, display of a virtual stylus, and so forth). In some embodiments, the object may be a rendering of a button.

In some embodiments, passive stylus 900 may control a virtual user input device rendered within the 3D scene. In such embodiments, tracked movement of the passive stylus 900 may be mapped to virtual movements of the virtual user input device. In some embodiments, the virtual user input device may be rendered as a virtual stylus, a virtual finger, and/or some other type of virtual pointing device. In such embodiments, the passive stylus 900 may be manipulated to control the virtual user input device to select various objects within the 3D scene, such as a virtual 3D object, a virtual menu, a virtual button, and so forth.

In some embodiments, tracking location of passive stylus 900 along with hand movement recognition may aid in determining a user's intent when interacting with a 3D scene. For example, if a user were to rotate a passive stylus, such as passive stylus 900, 180 degrees, as if to switch ends of the passive stylus pointing in the direction of the 3D scene, hand movement recognition may be used to determine whether the user intends to use the passive stylus as an eraser (e.g., after rotation, holds the stylus in a manner resembling a person intent on erasing markings on a paper) or is intending to use the passive stylus backwards. As further examples, user intention may be inferred based on passive stylus position and orientation with respect to the system and recognition of the user's hand movement to distinguish whether the user intends to use the passive stylus as pointer, a pen, a knitting needle, a drum stick, a hammer, and so forth.

In some embodiments, hand position and movements coupled with passive stylus 900 tracking information may offer a more insightful view into what a user intends to accomplish. For example, circular motions of a passive stylus when being held like a fork may be differentiated from circular motions of the passive stylus when being held like a paintbrush.

In some embodiments, passive stylus 900 may include a bar code and/or a quick response (QR) code. In some embodiments, the bar/QR code may be recognized (e.g., captured via a camera) by the system (e.g., systems 100A-B and/or 500A-B) and linked to a user. Thus, once identified by the bar/QR code, passive stylus/user specific information resident (or stored) in the system and/or in a server in communication with the system (e.g., a local cloud connected via an intranet and/or a remote cloud connected via the Internet) may be used to apply passive stylus/user specific preferences to the system and/or software, thereby enhancing user experience.

Figure 10:
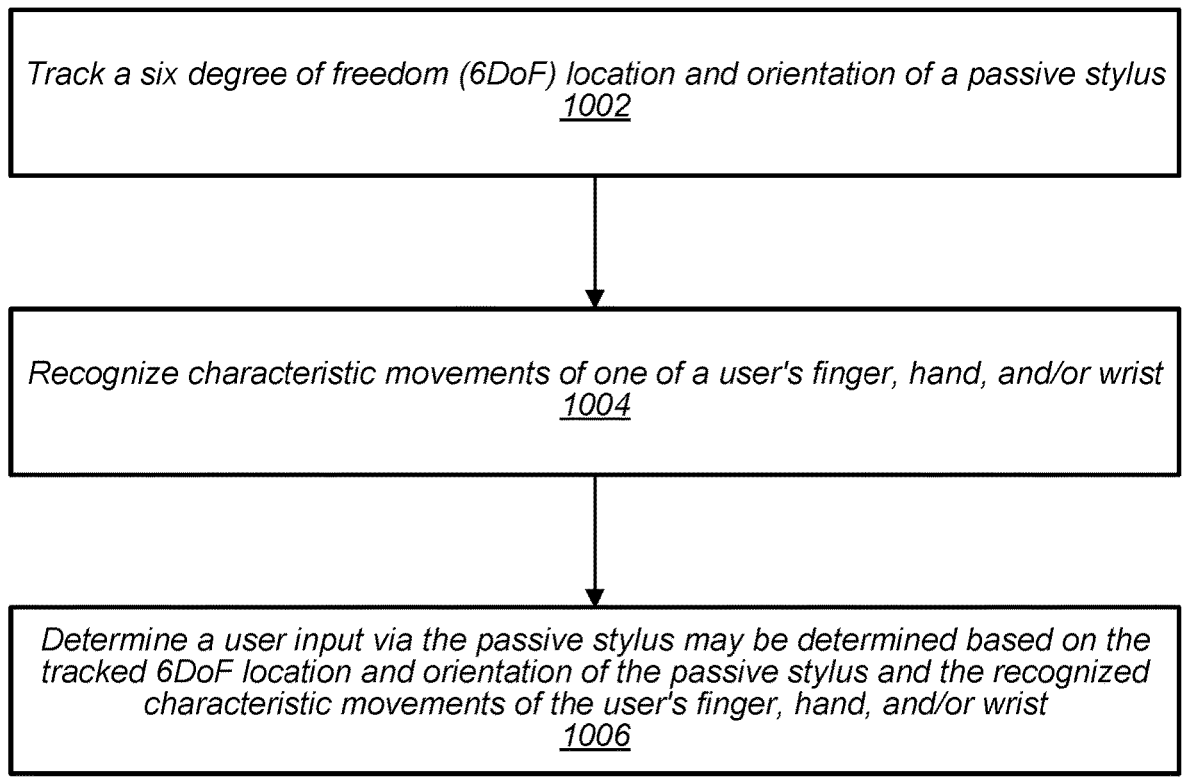
FIG. 10 illustrates a block diagram of an example of a method for a three dimensional (3D) display system to determine a user input via a passive stylus, according to some embodiment.

FIG. 10 illustrates a block diagram of an example of a method for a three dimensional (3D) display system to determine a user input via a passive stylus, according to some embodiment. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, a six degree of freedom (6DoF) location and orientation of a passive stylus may be tracked by a tracking system via a retroreflector system disposed on the passive stylus. In some embodiments, the passive stylus may be useable to interact with a virtual 3D scene being displayed via a 3D display. In some embodiments, tracking the 6DoF location and orientation of the passive stylus may include tracking each retroreflector of the retroreflector system and, for each retroreflector of the retroreflector system, comparing a current location of the retroreflector to a prior location of the retroreflector and determining a change in location based on the comparison. In some embodiments, the change in location may be useable to determine the 6DoF position and orientation of the passive stylus. In some embodiments, the tracking system may include an image tracking system that includes at least two cameras. In some embodiments, the (at least two) cameras may include any, any combination of, and/or all of passive infrared cameras, thermal cameras and/or computer vision cameras. Other examples may include complementary metal-oxide-semiconductor (CMOS) image sensors and/or computer images sensors such as commonly used in mobile devices, laptops, and computer vision. Note that in some embodiments, a single camera may be used in combination with knowledge of physical size of an object (e.g., size of a passive stylus). In some embodiments, the 6DoF position and orientation of the passive stylus may be relative to the 3D display.

In some embodiments, tracking the 6DoF location and orientation of the passive stylus may include distinguish each retroreflector of the retroreflector system based on a shape of each retroreflector. In some embodiments, tracking the 6DoF location and orientation of the passive stylus may include distinguishing a first group of retroreflectors of the retroreflector system based on a shape of the first group of retroreflectors.

In some embodiments, one and/or both of a bar code and/or a quick response code (e.g., code) may be disposed on the passive stylus and may indicate characteristics associated with the passive stylus. In some embodiments, characteristics of the passive stylus may be determined by scanning one code disposed on the passive stylus. In some embodiments, the code may include information identifying the passive stylus and instructions for contacting a server to download the characteristics of the passive stylus. In some embodiments, the server may be contacted to download the characteristics of the passive stylus and the characteristics of the passive stylus may be associated with the passive stylus.

In some embodiments, a first pattern of the retroreflector system may include a spiral pattern of retroreflectors along a longitudinal axis of the passive stylus, e.g., as illustrated by FIGS. 8A-B and 9A-B. In some embodiments, the retroreflector system may include a first pattern and a second pattern (e.g., as illustrated by FIGS. 9A-B). In some embodiments, the first pattern may include a spiral pattern of retroreflectors along a longitudinal axis of the passive stylus. In some embodiments, the second pattern may include a set of retroreflectors dispersed along and around a length of the passive stylus.

At 1004, characteristic movements of one of a user's finger, hand, and/or wrist may be recognized by the tracking system. In some embodiments, the tracking system (and/or motion recognition system) may be trained to recognize the characteristic movements. In some embodiments, the tracking system may track position (e.g., X, Y, and Z location) of a user's finger, hand, and/or wrist as well as orientation (e.g., pitch, yaw, roll) of the user's finger, hand, and/or wrist to recognize characteristic movements. In some embodiments, the position and orientation of the user's finger, hand, and/or wrist may be relative to the 3D display. In some embodiments, the characteristic movements may aid in determination of a roll angle and/or a change in roll angle of the passive stylus.

At 1006, a user input via the passive stylus may be determined based on the tracked 6DoF location and orientation of the passive stylus and the recognized characteristic movements of the user's finger, hand, and/or wrist. In some embodiments, the user input may include a button press. In some embodiments, the user input may be determined to be a button press based, at least in part, on a characteristic movement of a user's finger, hand, and/or wrist at a specified location on the passive stylus. In some embodiments, the specified location may include a faux button. In some embodiments, the faux button may include one, one or more of, a combination of, and/or all of of a raised area on the passive stylus, a depressed area on the passive stylus, or a visible marker on the passive stylus, and/or an area of differing texture on the passive stylus.

Recognition System Training

In some embodiments, a hand gesture recognition system, e.g., as described above, may be trained to detect characteristic motions of a human hand/wrist rolling a passive stylus. In some embodiments, training a machine learning model to recognize gestures of a hand holding and/or manipulating a passive stylus may include feature generation, development of a recurrent neural network (RNN) and/or development of a combination of a RNN and a convolutional neural network (CNN), collect training data and train the machine learning model, and test the machine learning model.

In some embodiments, feature generation may include breaking down sequences of visual frames (e.g., of gestures of a hand holding and/or manipulating a passive stylus) into discrete segments, e.g., on an order of 1 to 2 seconds or less. In some embodiments, signal processing may be performed on each discrete segment to identify certain (or particular) elements of the features, e.g., such as frequency components and/or intensity. In some embodiments, the identified elements may be mathematically differentiated (e.g., signals representing the identified elements may be mathematically differentiated) to extract (or determine) rate of change of attributes associated with the identified elements.

In some embodiments, development (or building) of an RNN may include training the RNN to identify elements and sequences of the generated features. Note that the RNN may be advantageous as compare to a traditional CNN as least because the RNN may consider previous events as inputs to the RNN. Thus, where a CNN can identify an object from a single image, an RNN may be better suited for a sequence of images. In some embodiments, a CNN may be combined with the RNN and/or a CNN may be used as one or more inputs to the RNN. In some embodiments, a CNN may be used as a preprocessing step (e.g., to generate features). For example, a CNN could be used to identify and find objects such as a hand and/or passive stylus in an image frame. In addition, the CNN may provide an estimate of a direction of a tip of the passive stylus, a style of a hand holding the passive stylus (e.g., traditional, rotated with thumb on a button(s), a middle finger on a main button, and/or holding the passive stylus, e.g., like a scalpel, a knife, a pen, and so forth).

In some embodiments, collection of training data may include collection of a large quantity of images of passive stylus/hand movements along with passive stylus tracking data. For example, generate 100,000 s of sequences of images of a user pressing a first button, pressing second button, and when the user is not pressing a button at all. These sequences of images may be broken down into smaller image sequences and mathematically processed to a generate features. Additionally, these smaller image sequences may be labeled as known features such as 'front button', 'back left button', or 'no button', thus, the machine learning model can train to identify these known features, e.g., by iterating until it has minimized a defined error function.

In some embodiments, some sample sequences of the training data may be reserved, e.g., to test the model. In some embodiments, new input (e.g., data from new users, in new lighting conditions, and so forth beyond the test data may be used to further test and improve the model.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium storing programming instructions executable by processing circuitry of a wireless device comprising a three dimensional (3D) display to:
    track six degree of freedom (6DoF) location and orientation of a passive stylus via a retroreflector system disposed on the passive stylus, wherein the passive stylus is useable to interact with a virtual 3D scene displayed via the 3D display of the wireless device;
    track 6DoF location and orientation of the passive stylus by distinguishing a first group of retroreflectors of the retroreflector system based on a shape of the first group of retroreflectors;
    recognize characteristic movements of one of a user's finger, hand, and/or wrist; and
    determine, based on the tracked 6DoF location and orientation of the passive stylus and the recognized characteristic movements, a user input via the passive stylus.

2. The non-transitory computer readable memory medium of claim 1,
    wherein, to track the 6DoF location and orientation of the passive stylus, the programming instructions are further executable to:
        track each retroreflector of the retroreflector system; and
        for each retroreflector:
            compare a current location of the retroreflector to a prior location of the retroreflector; and determine a change in location based on the comparison, wherein the change in location is useable to determine the 6DoF position and orientation of the passive stylus.

3. The non-transitory computer readable memory medium of claim 1,
wherein, to track the 6DoF location and orientation of the passive stylus, the programming instructions are further executable to:
track the retroreflector system via an image tracking system comprised in the wireless device, and wherein the tracking system comprises at least two cameras.

4. The non-transitory computer readable memory medium of claim 1,
wherein, to track the 6DoF location and orientation of the passive stylus, the programming instructions are further executable to:
distinguish each retroreflector of the retroreflector system based on a shape of each retroreflector.

5. The non-transitory computer readable memory medium of claim 1,
wherein one of a bar code or a quick response code is disposed on the passive stylus, wherein characteristics associated with the passive stylus are indicated by the bar code or quick response code.

6. The non-transitory computer readable memory medium of claim 5,
wherein the programming instructions are further executable to determine characteristics, including a first pattern of the retroreflector system, based on scanning one of the bar code or the quick response code disposed on the passive stylus.

7. The non-transitory computer readable memory medium of claim 1,
wherein the 6DoF position and orientation of the passive stylus is relative to the 3D display.

8. The non-transitory computer readable memory medium of claim 1,
wherein a first pattern of the retroreflector system comprises a spiral pattern of retroreflectors along a longitudinal axis of the passive stylus.

9. The non-transitory computer readable memory medium of claim 1,
wherein the retroreflector system comprises a first pattern and a second pattern, wherein the first pattern comprises a spiral pattern of retroreflectors along a longitudinal axis of the passive stylus, and wherein the second pattern comprises a set of retroreflectors dispersed along and around a length of the passive stylus.

10. The non-transitory computer readable memory medium of claim 1,
wherein the user input comprises a button press.

11. The non-transitory computer readable memory medium of claim 10,
wherein the programming instructions are further executable to:
determine that the user input comprises the button press, based, at least in part, on a characteristic movement of a user's finger, hand, and/or wrist at a specified location on the passive stylus.

12. The non-transitory computer readable memory medium of claim 11,
wherein the specified location comprises a faux button.

13. The non-transitory computer readable memory medium of claim 12,
wherein the faux button comprises one of a raised area on the passive stylus, a depressed area on the passive stylus, a visible marker on the passive stylus, or an area of differing texture on the passive stylus.

14. The non-transitory computer readable memory medium of claim 1,
wherein the characteristic movements aid in determination of a roll angle and/or a change in roll angle of the passive stylus.

15. The non-transitory computer readable memory medium of claim 1,
wherein the passive stylus does not require power.

16. The non-transitory computer readable memory medium of claim 1,
wherein the passive stylus does not contain electronic components.

17. The non-transitory computer readable memory medium of claim 1,
wherein the passive stylus comprises:
at least two faux buttons, wherein the faux buttons are used to interact with the virtual 3D scene displayed via the 3D display; and
two ends, wherein the two ends are used to interact with the virtual 3D scene displayed via the 3D display.

18. A wireless device, comprising:
a memory;
a three dimensional (3D) display; and
processing circuitry in communication with the memory and the 3D display, wherein the processing circuitry is configured to cause the wireless device to:
track six degree of freedom (6DoF) location and orientation of a passive stylus via a retroreflector system disposed on the passive stylus, wherein the passive stylus is useable to interact with a virtual 3D scene displayed via the 3D display;
track 6DoF location and orientation of the passive stylus by distinguishing a first group of retroreflectors of the retroreflector system based on a shape of the first group of retroreflectors;
recognize characteristic movements of one of a user's finger, hand, and/or wrist; and
determine, based on the tracked 6DoF location and orientation of the passive stylus and the recognized characteristic movements, a user input via the passive stylus.

19. The wireless device of claim 18,
wherein the 6DoF position and orientation of the passive stylus is relative to the 3D display.

20. The wireless device of claim 18,
wherein a first pattern of the retroreflector system comprises a spiral pattern of retroreflectors along a longitudinal axis of the passive stylus.

21. The wireless device of claim 18,
wherein the retroreflector system comprises a first pattern and a second pattern, wherein the first pattern comprises a spiral pattern of retroreflectors along a longitudinal axis of the passive stylus, and wherein the second pattern comprises a set of retroreflectors dispersed along and around a length of the passive stylus.

22. The wireless device of claim 18,
wherein the user input comprises a button press, and wherein the processing circuitry is further configured to:
determine that the user input comprises the button press, based, at least in part, on a characteristic movement of a user's finger, hand, and/or wrist at a specified location on the passive stylus.

23. The wireless device of claim 18,
wherein the specified location comprises a faux button, and wherein the faux button comprises one of a raised area on the passive stylus, a depressed area on the passive stylus, a visible marker on the passive stylus, or an area of differing texture on the passive stylus.

24. The wireless device of claim 18, further comprising:
at least one antenna; and
at least one radio in communication with the at least one antenna and configured to perform wireless communication using at least one radio access technology (RAT).

25. A three dimensional (3D) stereoscopic display system, comprising:
a memory;
a 3D display; and
processing circuitry in communication with the memory and the 3D display, wherein the processing circuitry is configured to cause the 3D stereoscopic display system to:
track six degree of freedom (6DoF) location and orientation of a passive stylus via a retroreflector system disposed on the passive stylus, wherein the passive stylus is useable to interact with a virtual 3D scene displayed via the 3D display;
track 6DoF location and orientation of the passive stylus by distinguishing a first group of retroreflectors of the retroreflector system based on a shape of the first group of retroreflectors;
recognize characteristic movements of one of a user's finger, hand, and/or wrist; and
determine, based on the tracked 6DoF location and orientation of the passive stylus and the recognized characteristic movements, a user input via the passive stylus.

26. The 3D stereoscopic display system of claim 25,
wherein, to track the 6DoF location and orientation of the passive stylus, the processing circuitry is further configured to:
track each retroreflector of the retroreflector system; and
for each retroreflector:
compare a current location of the retroreflector to a prior location of the retroreflector; and
determine a change in location based on the comparison, wherein the change in location is useable to determine the 6DoF position and orientation of the passive stylus.

27. The 3D stereoscopic display system of claim 25, further comprising:
an image tracking system, wherein the tracking system comprises at least two cameras; and
wherein, to track the 6DoF location and orientation of the passive stylus, the processing circuitry is further configured to:
track the retroreflector system via the image tracking system.

28. The 3D stereoscopic display system of claim 25,
wherein, to track the 6DoF location and orientation of the passive stylus, the processing circuitry is further configured to:
distinguish each retroreflector of the retroreflector system based on a shape of each retroreflector.

29. The 3D stereoscopic display system of claim 25,
wherein one of a bar code or a quick response code is disposed on the passive stylus, wherein characteristics associated with the passive stylus are indicated by the bar code or quick response code, and wherein the processing circuitry is further configured to determine characteristics, including a first pattern of the retroreflector system, based on scanning one of the bar code or the quick response code disposed on the passive stylus.

30. The 3D stereoscopic display system of claim 25,
wherein the passive stylus comprises:
at least two faux buttons, wherein the faux buttons are used to interact with the virtual 3D scene displayed via the 3D display; and
two ends, wherein the two ends are used to interact with the virtual 3D scene displayed via the 3D display.

* * * * *